United States Patent
Biswas et al.

(10) Patent No.: US 12,475,359 B2
(45) Date of Patent: Nov. 18, 2025

(54) METHOD AND APPARATUS FOR DETERMINING PARAMETERS OF A GENERATIVE NEURAL NETWORK

(71) Applicant: DOLBY INTERNATIONAL AB, Dublin (IE)

(72) Inventors: Arijit Biswas, Erlangen (DE); Simon Plain, Nuremberg (DE)

(73) Assignee: DOLBY INTERNATIONAL AB, Dublin (IE)

( * ) Notice: Subject to any disclaimer, the term of this patent is extended or adjusted under 35 U.S.C. 154(b) by 266 days.

(21) Appl. No.: 17/927,929

(22) PCT Filed: May 31, 2021

(86) PCT No.: PCT/EP2021/064511
§ 371 (c)(1),
(2) Date: Nov. 28, 2022

(87) PCT Pub. No.: WO2021/245015
PCT Pub. Date: Dec. 9, 2021

(65) Prior Publication Data
US 2023/0229892 A1    Jul. 20, 2023

Related U.S. Application Data

(60) Provisional application No. 63/177,511, filed on Apr. 21, 2021, provisional application No. 63/032,903, filed on Jun. 1, 2020.

(30) Foreign Application Priority Data

Jun. 23, 2020    (EP) ..................................... 20181683

(51) Int. Cl.
*G10L 15/16*        (2006.01)
*G06N 3/0455*      (2023.01)
(Continued)

(52) U.S. Cl.
CPC .......... *G06N 3/0455* (2023.01); *G06N 3/082* (2013.01); *G10L 19/26* (2013.01); *G10L 25/30* (2013.01); *G10L 25/69* (2013.01)

(58) Field of Classification Search
None
See application file for complete search history.

(56) References Cited

U.S. PATENT DOCUMENTS

| 10,311,046 B2 | 6/2019 | Hunicken |
| 11,651,225 B2 * | 5/2023 | Wang ..................... G06N 3/045 706/25 |

(Continued)

FOREIGN PATENT DOCUMENTS

| CN | 109948717 A | 6/2019 |
| CN | 110085203 A | 8/2019 |

(Continued)

OTHER PUBLICATIONS

Aggarwal, Charu C. "Neural Networks and Deep Learning: A Textbook" in Neural Networks and Deep Learning: A Textbook Aug. 26, 2018.

(Continued)

*Primary Examiner* — Jakieda R Jackson

(57) ABSTRACT

Described herein is a method of determining parameters for a generative neural network for processing an audio signal, wherein the generative neural network includes an encoder stage mapping to a coded feature space and a decoder stage, each stage including a plurality of convolutional layers with one or more weight coefficients, the method comprising a plurality of cycles with sequential processes of: pruning the weight coefficients of either or both stages based on pruning control information, the pruning control information determining the number of weight coefficients that are pruned for respective convolutional layers; training the pruned generative neural network based on a set of training data; deter- (Continued)

mining a loss for the trained and pruned generative neural network based on a loss function; and determining updated pruning control information based on the determined loss and a target loss. Further described are corresponding apparatus, programs, and computer-readable storage media.

21 Claims, 6 Drawing Sheets

(51) Int. Cl.
*G06N 3/082* (2023.01)
*G10L 19/26* (2013.01)
*G10L 25/30* (2013.01)
*G10L 25/69* (2013.01)

(56) References Cited

U.S. PATENT DOCUMENTS

| | | | | |
|---|---|---|---|---|
| 11,663,481 | B2* | 5/2023 | Liu | G06N 3/04 706/25 |
| 2016/0019908 | A1* | 1/2016 | Hedelin | G10L 19/008 704/500 |
| 2017/0278135 | A1 | 9/2017 | Majumdar | |
| 2018/0323810 | A1* | 11/2018 | Sarkis | H03M 13/13 |
| 2019/0130903 | A1 | 5/2019 | Sriram | |
| 2019/0150794 | A1* | 5/2019 | Vrudhula | A61B 5/349 |
| 2019/0244103 | A1* | 8/2019 | Wang | G06N 3/088 |
| 2019/0362235 | A1* | 11/2019 | Xu | G06N 3/04 |
| 2020/0097826 | A1* | 3/2020 | Du | G06N 3/063 |
| 2020/0143261 | A1* | 5/2020 | Morgan | G06N 3/042 |
| 2020/0159997 | A1* | 5/2020 | Wu | G06N 3/047 |
| 2020/0160185 | A1* | 5/2020 | Praveen | G06N 3/04 |
| 2020/0401895 | A1* | 12/2020 | Litvak | G06N 3/063 |
| 2021/0090694 | A1* | 3/2021 | Colley | G16B 30/00 |
| 2021/0264278 | A1* | 8/2021 | Liu | G06N 3/082 |

FOREIGN PATENT DOCUMENTS

| | | |
|---|---|---|
| CN | 108597496 B | 8/2020 |
| IN | 201921012207 A | 5/2019 |
| KR | 20190049552 | 5/2019 |
| WO | 2020047298 A1 | 3/2020 |
| WO | 2022081915 | 4/2022 |

OTHER PUBLICATIONS

Biswas, A. et al "Audio Codec Enhancement with Generative Adversarial Networks" 45th IEEE International Conference on acoustics, Speech and Signal Processing, Jan. 2020.

Briot Alexandre, et al "Analysis of Efficient CNN Design Techniques for Semantic Segmentation" IEEE Conference on Computer Vision and Pattern Recognition Workshops, Jun. 18, 2018, pp. 776-77609.

Hao-Wen, Dong et al "Convolutional Generative Adversarial Networks with Binary Neurons for polyphonic Music Generation" Engineering Village, Research Center for IT innovation, Jul. 2017.

Moussa Ahmad et al: Audio Translation with Conditional Generative Adversarial Networks 11 , 2020 International Conference on Artificial Intelligence in Information and Communication (ICAIIC), IEEE, Feb. 19, 2020 (Feb. 19, 2020), pp. 438-442.

Nitish Srivastava, et al "Dropout: A Simple Way to Prevent Neural Networks from Overfitting" Journal of Machine Learning Research, vol. 15, No. 1, Jun. 1, 2014, pp. 1929-1958.

Pascual, S. et al "SEGAN: Speech Enhancement Generative Adversarial Network" Interspeech 2017, Jun. 9, 2017, pp. 3642-3646.

Plain, S. et al "Pruning of an Audio Enhancing Deep Generative Neural Network" AES Presented at the 148th Convention, Jun. 2-5, 2020.

Yang, Li-Chia, et al "MIDINET: A Convolutional Generative Adversarial Network for Symbolic-Domain Music Generation" Research Center for IT Innovation, Academia, Jul. 2017.

Yu, et al "Self-Supervised GAN Compression" ICLR 2020 Conference, Sep. 2019.

Zhu, M. et al "To Prune, or not to prune: Exploring the efficacy of Pruning for Model Compression" Department of computer science stanford University, Nov. 13, 2017.

* cited by examiner

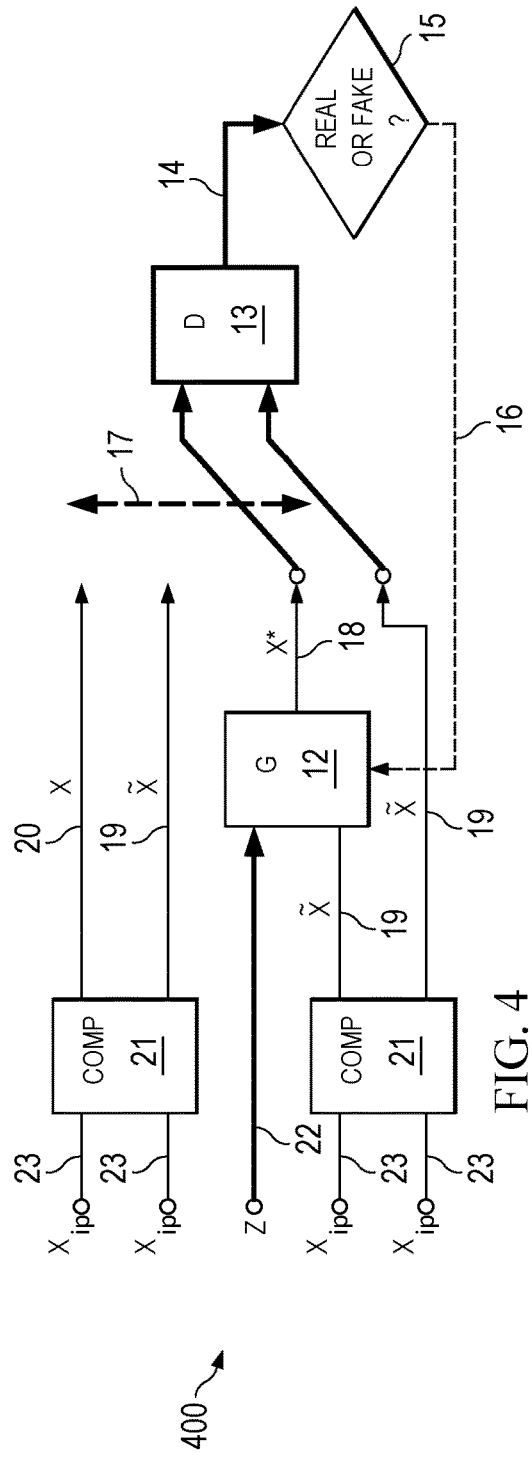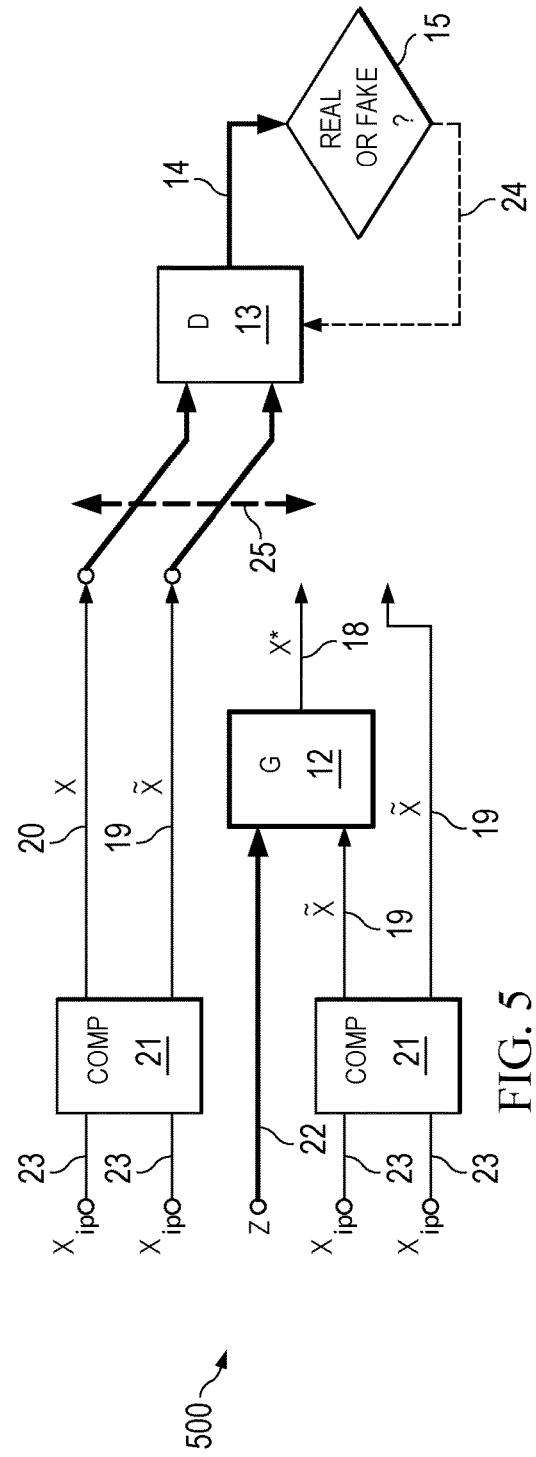

METHOD AND APPARATUS FOR DETERMINING PARAMETERS OF A GENERATIVE NEURAL NETWORK

CROSS-REFERENCE TO RELATED APPLICATIONS

This application is a U.S. National Stage application under U.S.C. 371 of International Application No. PCT/EP2021/064511, filed on 31 May 2021 (reference: D20038WO01), which claims priority of the following priority applications: U.S. provisional application 63/032,903 (reference: D20038USP1), filed 1 Jun. 2020, EP Application 20181683.2 (reference: D20038EP), filed 23 Jun. 2020 and U.S. provisional application 63/177,511 (reference: D20038USP2), filed 21 Apr. 2021, each of which are hereby incorporated by reference.

TECHNOLOGY

The present disclosure generally relates to a method of configuring a generative neural network, for example for audio processing, and in particular to determining parameters (e.g., filter parameters) for the generative neural network.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Audio recording systems are used to encode audio signals into encoded signals that are suitable for transmission or storage, and then subsequently receive or retrieve and decode the coded signals to obtain versions of the original audio signals for playback. Low-bitrate audio coding is a perceptual audio compression technology which allows to reduce bandwidth and storage requirements. Examples of perceptual audio coding systems include AC3, Advanced Audio Coding (AAC), and the more recently standardized AC-4 audio coding system, standardized by ETSI and included in ATSC 3.0.

However, low-bitrate audio coding introduces unavoidable coding artifacts. Audio coded at low bitrates may thus degrade in quality due to noise introduced by quantization and coding. A particular problem in this regard is the so-called pre-echo artifact. A pre-echo artifact is generated in the quantization of transient audio signals in the frequency domain which causes the quantization noise to spread before the transient itself. Pre-echo noise indeed significantly impairs the quality of an audio codec such as for example the MPEG AAC codec, or any other transform-based (e.g. MDCT-based) audio codec.

Up to now, several methods have been developed to reduce pre-echo noise and thereby enhance the quality of low-bitrate coded audio. These methods include short block switching and temporal noise shaping (TNS). The latter technique is based on the application of prediction filters in the frequency domain to shape the quantization noise in the time domain to make the noise appear less disturbing to the listener.

Besides by pre-echo artifacts, the quality of low-bitrate coded audio is also impaired by quantization noise. In order to reduce information capacity requirements, the spectral components of the audio signal are quantized. Quantization, however, injects noise into the signal. Generally, perceptual audio coding systems involve the use of psychoacoustic models to control the amplitude of quantization noise so that it is masked or rendered inaudible by spectral components in the signal.

Companding is a coding tool in the AC-4 coding system, which improves perceptual coding of speech and dense transient events (e.g., applause). Benefits of companding include reducing short-time dynamics of an input signal to thus reduce bit rate demands at the encoder side, while at the same time ensuring proper temporal noise shaping at the decoder side.

Deep learning has been found to offer new opportunities for improving coded audio, with particular success coming from attempts using Generative Neural Networks, such as for example Convolutional Neural Networks (CNNs). Transient artifact reduction, bandwidth extension, and quantization noise shaping are some of the issues that may profit from employing deep learning-based methods. However, a fully trained generative neural network may comprise a plurality of parameters (e.g., weight coefficients), so that the computational requirements for operating generative neural networks are high. This may create limitations for deployment on memory and/or battery constrained devices. In general, there may be only limited utility of generative neural networks when processing audio with mobile devices that have limited memory capacity and/or computing resources.

In view of the above, it would be desirable to increase the efficiency of deep learning based audio enhancement (e.g., audio processing by means of generative neural networks). In particular, it would be desirable to reduce memory usage and computational complexity of deep learning based audio processing without deteriorating performance.

SUMMARY

In accordance with an aspect of the present disclosure there is provided a method for determining a Generator of a Generative Adversarial Network, GAN, for post-processing of an audio signal, wherein the Generator includes an encoder stage and a decoder stage, wherein the encoder stage and the decoder stage each include a plurality of layers with one or more filters in each layer, wherein each filter includes one or more weights (e.g., filter coefficients), and wherein a bottleneck layer of the encoder stage of the Generator maps to a coded audio feature space between the encoder stage and the decoder stage. The method may include the step of (a) pruning the encoder stage and/or the decoder stage based on a set of sensitivity parameters that indicate thresholds for the pruning. And the method may include the step of (b) pruning the bottleneck layer of the encoder stage based on the set of sensitivity parameters.

In some embodiments, the pruning may include zeroing one or more weights based on the set of sensitivity parameters.

In some embodiments, the method may further include pruning, based on the set of sensitivity parameters, one or more layers of the encoder stage and/or the decoder stage adjacent to the bottleneck layer; wherein the set of sensitivity parameters may be chosen such that an increase in sparsity of the bottleneck layer is lower than the increase in sparsity of either of the one or more pruned layers of the encoder stage and/or the decoder stage.

In some embodiments, a number of pruned layers in the encoder stage may be less than the number of pruned layers in the decoder stage.

In some embodiments, the method may further comprise a step of performing a sensitivity analysis on the plurality of layers of the encoder stage and the decoder stage and the bottleneck layer of the encoder stage to obtain the set of sensitivity parameters.

In some embodiments, the sensitivity analysis may be performed on the plurality of layers of the encoder stage and the decoder stage and the bottleneck layer of the encoder stage of a second Generator of the GAN, wherein the second Generator may be a trained and unpruned Generator.

In some embodiments, performing step (a) and step (b) may correspond to a pruning pass, wherein the method may further include performing one or more cycles of a pruning pass alternating with one or more training passes of a GAN setting.

In some embodiments, the one or more training passes may be performed in the dynamic range reduced domain in the GAN setting, wherein the GAN setting may comprise the Generator and a Discriminator.

In some embodiments, the one or more training passes may include the steps of:
(a) inputting a dynamic range reduced raw audio training signal into the Generator;
(b) generating, by the Generator, an enhanced dynamic range reduced audio training signal based on the dynamic range reduced raw audio training signal;
(c) inputting, one at a time, the enhanced dynamic range reduced audio training signal and a corresponding original dynamic range reduced audio signal, from which the dynamic range reduced raw audio training signal has been derived, into the Discriminator;
(d) judging, by the Discriminator, whether the input dynamic range reduced audio signal is the enhanced dynamic range reduced audio training signal or the original dynamic range reduced audio signal; and
(e) tuning the parameters of the Generator until the Discriminator can no longer distinguish the enhanced dynamic range reduced audio training signal from the original dynamic range reduced audio signal.

In some embodiments, the method may further comprise performing a listening test after a plurality of cycles of pruning passes alternating with training passes.

In some embodiments, performing the listening test may involve comparing the output of the trained and pruned Generator with the output of the second Generator.

In some embodiments, performing the pruning pass may involve pruning the Generator, but may not involve pruning the Discriminator.

In accordance with a further aspect of the present disclosure there is provided a method of generating, in a dynamic range reduced domain, enhanced audio data from a low-bitrate audio bitstream. The method may include the step of (a) receiving the low-bitrate audio bitstream. The method may further include the step of (b) core decoding the low-bitrate audio bitstream and obtaining dynamic range reduced raw audio data based on the low-bitrate audio bitstream. The method may further include the step of (c) inputting the dynamic range reduced raw audio data into a Generator of a Generative Adversarial Network, GAN, for processing the dynamic range reduced raw audio data, wherein the Generator includes an encoder stage and a decoder stage, wherein the encoder stage and the decoder stage each include a plurality of layers with one or more filters in each layer, wherein each filter includes one or more weights, wherein a bottleneck layer of the encoder stage of the Generator maps to a coded audio feature space between the encoder stage and the decoder stage, and wherein one or more layers of the encoder stage and/or the decoder stage adjacent to the bottleneck layer are more sparse than the bottleneck layer, wherein sparsity is determined by a percentage of zero-valued weights, and wherein the one or more layers of the encoder stage and/or the decoder stage adjacent to the bottleneck layer have a higher percentage of zero-valued weights than the bottleneck layer. The method may further include the step of (d) enhancing the dynamic range reduced raw audio data by the Generator in the dynamic range reduced domain. The method may include the step of (e) obtaining, as an output from the Generator, enhanced dynamic range reduced audio data for subsequent expansion of the dynamic range. And the method may include the step of (0 expanding the enhanced dynamic range reduced audio data to the expanded dynamic range domain by performing an expansion operation.

In some embodiments, the bottleneck layer may be more sparse than one or more outer layers of the encoder stage and/or the decoder stage.

In some embodiments, the one or more layers of the encoder stage and/or the decoder stage adjacent to the bottleneck layer that are more sparse than the bottleneck layer may have a threshold number of weights.

In some embodiments, the Generator may have been obtained by pruning, wherein the pruning may include zeroing one or more weights based on a set of sensitivity parameters.

In some embodiments, obtaining the Generator by pruning may further include pruning, based on the set of sensitivity parameters, one or more layers of the encoder stage and/or the decoder stage adjacent to the bottleneck layer; wherein the set of sensitivity parameters may be chosen such that an increase in sparsity of the bottleneck layer is less than the increase in sparsity of either of the one or more pruned layers of the encoder stage and/or the decoder stage.

In some embodiments, the low-bitrate audio bitstream may be in AC-4 format.

In some embodiments, the expansion operation may be a companding operation based on a p-norm of spectral magnitudes for calculating respective gain values.

In some embodiments, the received low-bitrate audio bitstream may include metadata and step (a) further includes demultiplexing the received low-bitrate audio bitstream.

In some embodiments, in step (d) enhancing the dynamic range reduced raw audio data by the Generator may be based on the metadata.

In some embodiments, the metadata may include one or more items of companding control data.

In some embodiments, the companding control data may include information on a companding mode among one or more companding modes that had been used for encoding the audio data.

In some embodiments, the companding modes may include the companding mode of companding on, the companding mode of companding off and the companding mode of average companding.

In some embodiments, in step (d) enhancing the dynamic range reduced raw audio data by the Generator may depend on the companding mode indicated by the companding control data.

In some embodiments, if the companding mode is companding off, enhancing by the Generator may not be performed.

In accordance with another aspect of the present disclosure there is provided a method of generating, in a dynamic range reduced domain, enhanced audio data from a low-bitrate audio bitstream. The method may include the step of (a) receiving the low-bitrate audio bitstream. The method may further include the step of (b) core decoding the low-bitrate audio bitstream and obtaining dynamic range reduced raw audio data based on the low-bitrate audio bitstream. The method may further include the step of (c) inputting the dynamic range reduced raw audio data into a Generator of a Generative Adversarial Network, GAN, for processing the dynamic range reduced raw audio data, wherein the Generator includes an encoder stage and a decoder stage, wherein the encoder stage and the decoder stage each include a plurality of layers with one or more filters in each layer, wherein a bottleneck layer of the encoder stage of the Generator maps to a coded audio feature space between the encoder stage and the decoder stage, and wherein the Generator has been determined by: (i) pruning the encoder stage and/or the decoder stage based on a set of sensitivity parameters that indicate thresholds for the pruning; and (ii) pruning the bottleneck layer of the encoder stage based on the set of sensitivity parameters. The method may further include the step of (d) enhancing the dynamic range reduced raw audio data by the Generator in the dynamic range reduced domain. And the method may include the step of (e) obtaining, as an output from the Generator, enhanced dynamic range reduced audio data for subsequent expansion of the dynamic range.

In some embodiments, a number of pruned layers in the encoder stage may be less than the number of pruned layers in the decoder stage.

In some embodiments, the method may further comprise a step of performing a sensitivity analysis on the plurality of layers of the encoder stage and the decoder stage and the bottleneck layer of the encoder stage to obtain the set of sensitivity parameters.

In some embodiments, the sensitivity analysis may be performed on the plurality of layers of the encoder stage and the decoder stage and the bottleneck layer of the encoder stage of a second Generator of the GAN, wherein the second Generator may be a trained and unpruned Generator.

In some embodiments, performing step (i) and step (ii) may correspond to a pruning pass, wherein the method may further include performing one or more cycles of a pruning pass alternating with one or more training passes of a GAN setting.

The aforementioned embodiments of the method of generating, in a dynamic range reduced domain, enhanced audio data from a low-bitrate audio bitstream also apply to the above recited aspect.

In accordance with an aspect of the present disclosure there is provided a method of determining parameters for a computer-implemented generative neural network for processing an audio signal. As such, the method may be a method of configuring the generative neural network. The generative neural network may be a deep neural network. In general, the generative neural network may include an encoder stage (encoder) and a decoder stage (decoder). Further, the generative neural network may correspond to a Generator of a Generative Adversarial network (GAN) setup, for example. The encoder stage may map to a coded feature space or latent feature space (e.g., coded audio feature space). Each of the encoder stage and the decoder stage may include a plurality of convolutional layers. Each convolutional layer may include one or more weight coefficients. The weight coefficients may comprise (or correspond to) filter parameters of the convolutional layers of the generative neural network. The method may include a plurality of cycles, each cycle with a number of processes (e.g., sequential processes). One process may be a process of pruning the weight coefficients of the encoder stage and/or the decoder stage based on pruning control information to obtain a pruned generative neural network. The pruning control information may govern (e.g., determine) the number of weight coefficients that are pruned for respective convolutional layers. Another process may be a process of training the pruned generative neural network for one of more epochs based on a set of training data. Another process may be a process of determining a loss for the trained and pruned generative neural network based on a loss function. Yet another process may be a process of determining updated pruning control information based on the determined loss and a target loss for the generative neural network.

Thereby, optimized pruning control information can be determined automatically in the process of training the generative neural network. This may allow for an optimized trade-off between reduction of model complexity and perceptual quality of audio processed by the generative neural network. In particular, manual setting/adjusting of the pruning control information, which may be laborious and inefficient, and which may not yield optimal results can be avoided.

In some embodiments, the pruning may include zeroing (zeroing out, setting to zero) one or more weight coefficients based on the pruning control information.

In some embodiments, the pruning control information may include sensitivity parameters for the plurality of convolutional layers of the encoder stage and the decoder stage. There may be one sensitivity parameter per convolutional layer, for example. Each sensitivity parameter may set a ratio or share of weight coefficients that is to be pruned for the respective convolutional layer. Alternatively, the pruning control information may define, for each convolutional layer, a respective pruning threshold below which weight coefficients are to be pruned.

In some embodiments, the updated pruning control information may be determined so as to minimize a difference between the determined loss and the target loss.

In some embodiments, determining the updated pruning control information may include increasing or decreasing pruning sensitivity for the plurality of convolutional layers of the generative neural network. For example, the pruning sensitivity may be increased for all convolutional layers alike, or decreased for all convolutional layers alike.

In some embodiments, determining the updated pruning control information may include applying a scaling factor to the pruning control information to increase or decrease pruning sensitivity for the plurality of convolutional layers of the generative neural network. This scaling factor may be an overall scaling factor. The increase or decrease of pruning sensitivity (e.g., in terms of a ratio between updated and previous pruning sensitivity) may be uniform across all convolutional layers, for example.

In some embodiments, the aforementioned processes may be cycled through for a plurality of times until a convergence criterion is met. The cycling through the processes may be in loop-like manner.

In some embodiments, the convergence criterion may relate to whether a difference between the determined loss and the target loss is below a predetermined threshold and/or whether a change, from one cycle to the next, of the difference between the determined loss and the target loss is below a predetermined threshold.

In some embodiments, the method may further include setting the number of epochs for training in the process of training the generative neural network based on a rate of change of the pruning control information (or the determined loss) from one cycle to the next. A higher rate of change may result in fewer epochs for training, whereas a lower rate of change may result in more epochs.

In some embodiments, the loss function may include a component corresponding to an adversarial loss and/or a component corresponding to a time-domain L1-norm loss.

In some embodiments, the loss function may further include a component corresponding to a frequency-domain loss.

In some embodiments, the frequency-domain loss may be a multi-resolution Short-Time Fourier Transform (STFT) loss.

In some embodiments, the method may further include, prior to entering the plurality of cycles of the aforementioned processes, training the generative neural network using the set of training data for one or more epochs without pruning the weight coefficients of the encoder stage and the decoder stage. This may correspond to (partially) pre-training the generative neural network.

In some embodiments, the encoder stage may include a bottleneck layer that maps to the coded audio feature space. The pruning control information may be initially chosen such that the process of pruning the weight coefficients involves pruning the bottleneck layer as well as pruning one or more convolutional layers of the encoder stage and/or the decoder stage adjacent to the bottleneck layer. Further, the pruning control information may be initially chosen such that an increase in sparsity of the bottleneck layer is less than the increase in sparsity of the one or more pruned layers of the encoder stage and/or the decoder stage adjacent to the bottleneck layer.

In some embodiments, the pruning control information may be initially chosen such that the process of pruning the weight coefficients involves pruning less layers in the encoder stage than in the decoder stage.

In some embodiments, the method may further include training a second instance of the generative neural network based on the set of training data. Then, the method may yet further include determining a loss for the trained second instance of the generative neural network based on the loss function, and using said loss as the target loss for the generative neural network. It is understood throughout the disclosure that the second instance of the generative neural network has the same architecture (e.g., in terms of convolutional layers and weight coefficients) as the generative neural network. It is further understood that the second instance of the generative neural network is not pruned. Training of the second instance of the generative neural network may be full training, e.g., training for such number of epochs that a certain criterion or convergence criterion for full training is met.

In some embodiments, the method may further include training a second instance of the generative neural network based on the set of training data. Then, the method may yet further include performing a sensitivity analysis on the plurality of convolutional layers of the encoder stage and the decoder stage of the trained second instance of the generative neural network to obtain an initial set of pruning control information.

In accordance with a further aspect of the present disclosure there is provided an apparatus for generating, in a dynamic range reduced domain, enhanced audio data from a low-bitrate audio bitstream. The apparatus may include (a) a receiver for receiving the low-bitrate audio bitstream. The apparatus may further include (b) a core decoder for core decoding the received low-bitrate audio bitstream and obtaining dynamic range reduced raw audio data based on the low-bitrate audio bitstream. And the apparatus may include (c) a Generator of a Generative Adversarial Network, GAN, for enhancing the dynamic range reduced raw audio data in the dynamic range reduced domain, wherein the Generator includes an encoder stage and a decoder stage, wherein the encoder stage and the decoder stage each include a plurality of layers with one or more filters in each layer, wherein each filter includes one or more weights, wherein a bottleneck layer of the encoder stage of the Generator maps to a coded audio feature space between the encoder stage and the decoder stage, and wherein one or more layers of the encoder stage and/or the decoder stage adjacent to the bottleneck layer are more sparse than the bottleneck layer, wherein sparsity is determined by a percentage of zero-valued weights, and wherein the one or more layers of the encoder stage and/or the decoder stage adjacent to the bottleneck layer have a higher percentage of zero-valued weights than the bottleneck layer.

In some embodiments, the bottleneck layer may be more sparse than one or more outer layers of the encoder stage and/or the decoder stage.

In some embodiments, the one or more layers of the encoder stage and/or the decoder stage adjacent to the bottleneck layer that are more sparse than the bottleneck layer may have a threshold number of weights.

In some embodiments, the Generator may have been obtained by pruning, wherein the pruning may include zeroing one or more weights based on a set of sensitivity parameters.

In some embodiments, obtaining the Generator by pruning may further include pruning, based on the set of sensitivity parameters, one or more layers of the encoder stage and/or the decoder stage adjacent to the bottleneck layer; wherein the set of sensitivity parameters may be chosen such that an increase in sparsity of the bottleneck layer is less than the increase in sparsity of either of the one or more pruned layers of the encoder stage and/or the decoder stage.

In some embodiments, the apparatus may further include a demultiplexer for demultiplexing the received low-bitrate audio bitstream, wherein the received low-bitrate audio bitstream includes metadata.

In some embodiments, the metadata may include one or more items of companding control data.

In some embodiments, the companding control data may include information on a companding mode among one or more companding modes that had been used for encoding the audio data.

In some embodiments, the companding modes may include the companding mode of companding on, the companding mode of companding off and the companding mode of average companding.

In some embodiments, the Generator may be configured to enhance the dynamic range reduced raw audio data in the dynamic range reduced domain depending on the companding mode indicated by the companding control data.

In some embodiments, if the companding mode is companding off, the Generator may be configured not to perform enhancing.

In some embodiments, the apparatus may further include an expansion unit configured to perform an expansion operation to expand the enhanced dynamic range reduced audio data to an expanded dynamic range domain.

In accordance with another aspect of the present disclosure there is provided an apparatus for generating, in a dynamic range reduced domain, enhanced audio data from a low-bitrate audio bitstream. The apparatus may include (a) a receiver for receiving the low-bitrate audio bitstream. The apparatus may further include (b) a core decoder for core decoding the received low-bitrate audio bitstream and obtaining dynamic range reduced raw audio data based on the low-bitrate audio bitstream. And the apparatus may include (c) a Generator of a Generative Adversarial Network, GAN, for enhancing the dynamic range reduced raw audio data in the dynamic range reduced domain, wherein the Generator includes an encoder stage and a decoder stage, wherein the encoder stage and the decoder stage each include a plurality of layers with one or more filters in each layer, wherein a bottleneck layer of the encoder stage of the Generator maps to a coded audio feature space between the encoder stage and the decoder stage, and wherein the Generator has been determined by: (i) pruning the encoder stage and/or the decoder stage based on a set of sensitivity parameters that indicate thresholds for the pruning; and (ii) pruning the bottleneck layer of the encoder stage based on the set of sensitivity parameters.

The aforementioned embodiments of the apparatus for generating, in a dynamic range reduced domain, enhanced audio data from a low-bitrate audio bitstream also apply to the above recited aspect.

In accordance with a further aspect of the present disclosure there is provided a computer program product comprising a computer-readable storage medium with instructions adapted to cause the device to carry out a method for determining a Generator of a Generative Adversarial Network, GAN, for post-processing of an audio signal, wherein the Generator includes an encoder stage and a decoder stage, wherein the encoder stage and the decoder stage each include a plurality of layers with one or more filters in each layer, wherein each filter includes one or more weights (e.g., filter coefficients), and wherein a bottleneck layer of the encoder stage of the Generator maps to a coded audio feature space between the encoder stage and the decoder stage when executed by a device having processing capability.

In accordance with a further aspect of the present disclosure there is provided a computer program product comprising a computer-readable storage medium with instructions adapted to cause the device to carry out a method of generating, in a dynamic range reduced domain, enhanced audio data from a low-bitrate audio bitstream when executed by a device having processing capability.

In accordance with a further aspect of the present disclosure there is provided a system of an apparatus for generating, in a dynamic range reduced domain, enhanced audio data from a low-bitrate audio bitstream and a Generative Adversarial Network comprising a Generator and a Discriminator, wherein the system is configured to perform a method for determining a Generator of a Generative Adversarial Network, GAN, for post-processing of an audio signal, wherein the Generator includes an encoder stage and a decoder stage, wherein the encoder stage and the decoder stage each include a plurality of layers with one or more filters in each layer, wherein each filter includes one or more weights (e.g., filter coefficients), and wherein a bottleneck layer of the encoder stage of the Generator maps to a coded audio feature space between the encoder stage and the decoder stage or a method of generating, in a dynamic range reduced domain, enhanced audio data from a low-bitrate audio bitstream.

In accordance with a further aspect of the present disclosure there is provided a system of an apparatus for applying dynamic range reduction to input audio data and encoding the dynamic range reduced audio data in a bitstream at a low bitrate and an apparatus for generating, in a dynamic range reduced domain, enhanced audio data from a low-bitrate audio bitstream.

According to another aspect, a computer program is provided. The computer program may include instructions that, when executed by a processor (computer), cause the processor to carry out all steps of the methods described throughout the disclosure.

According to another aspect, a computer-readable storage medium is provided. The computer-readable storage medium may store the aforementioned computer program.

According to yet another aspect an apparatus (e.g., computer) including a processor and a memory coupled to the processor is provided. The processor may be adapted to carry out all steps of the methods described throughout the disclosure.

It will be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) (and, e.g., their steps or processes) are understood to likewise apply to the corresponding apparatus (and, e.g., their blocks, stages, or units), and vice versa.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Generative Neural Network Architecture

First, a generative neural network is described to which methods and apparatus according to the present disclosure may be applied. This generative neural network may relate to a Generator in a Generative Adversarial Network (GAN) setup, for example.

While the architecture of a generative neural network is generally not limited, the generative neural network includes an encoder stage (encoder) and a decoder stage (decoder). The encoder stage and the decoder stage of the generative neural network may be fully convolutional, and the decoder stage may mirror the encoder stage. The encoder stage as well as the decoder stage each include a plurality of layers (e.g., convolutional layers) with one or more filters (e.g., a plurality of filters) in each layer. Each filter includes one or more weights (weight coefficients, e.g., filter coefficients). A bottleneck layer (e.g., innermost layer) of the encoder stage of the generative neural network maps to a coded feature space (e.g., coded audio feature space) or latent space representation between the encoder stage and the decoder stage.

For example, the encoder stage as well as the decoder stage may each include a number of L layers with a number of $N_l$ filters in each layer, $l=1, \ldots, L$. L may be a natural number $\geq 1$ and $N_l$ may be natural numbers $\geq 1$. The size (also known as kernel size) of the $N_l$ filters in respective layers is not limited and may be chosen according to the requirements of the enhancement of the quality of (dynamic range reduced) raw audio data by the generative neural network. The filter size may, however, be the same in each of the L layers. The weights that may be pruned may correspond to the filter coefficients in each layer L.

Figure 1:
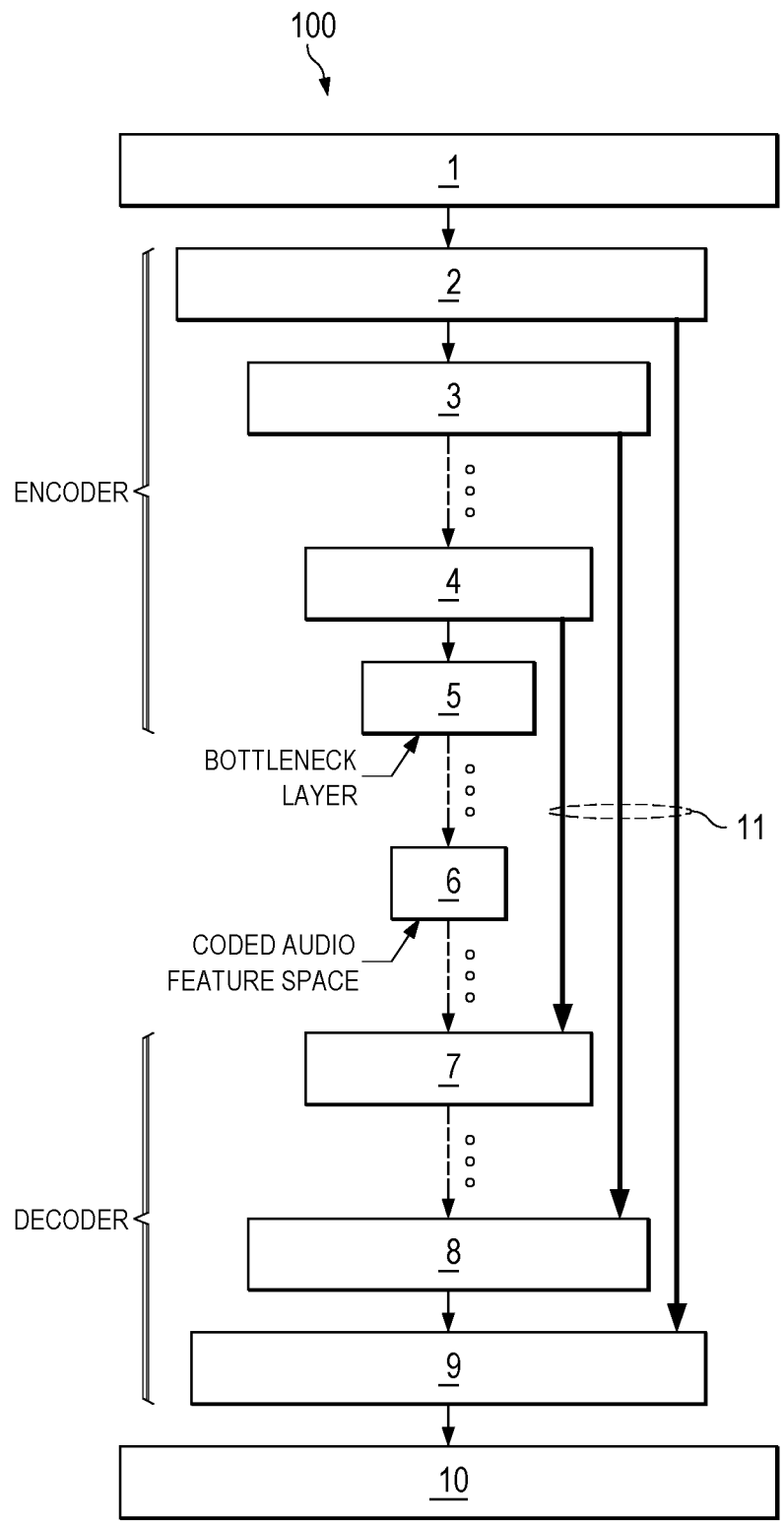
FIG. 1 schematically illustrates an example of an architecture of a generative neural network.

Referring now to the non-limiting example of FIG. 1, which schematically illustrates an architecture of a generative neural network, audio data may be input into the generative neural network in a first step, 1. The first illustrated encoder layer, 2, layer number L=1, may include $N_1=16$ filters having a filter size of 31. The second illustrated encoder layer, 3, layer number L=2, may include $N_2=32$ filters having a filter size of 31. Subsequent layers are omitted for reasons of clarity and conciseness. The third illustrated encoder layer, 4, layer number L=11, may include $N_{11}=512$ filters having a filter size of 31.

In each layer the number of filters may thus increase, i.e., the number of filters may increase towards deeper layers of the generative neural network. In one embodiment, each of the filters may operate on the audio data input into each of the encoder layers with a stride of >1. Each of the filters may, for example, operate on the audio data input into each of the encoder layers with a stride of 2. Thus, a learnable down-sampling by a factor of 2 may be performed. Alternatively, the filters may also operate with a stride of 1 in each of the encoder layers followed by a down-sampling by a factor of 2 (as in known signal processing). Alternatively, for example, each of the filters may operate on the audio data input into each of the encoder layers with a stride of 4, which may halve the overall number of layers in the generative neural network.

In at least one encoder layer and in at least one decoder layer of the generative neural network, a non-linear operation may be performed in addition as an activation. In one embodiment, the non-linear operation may include one or more of a parametric rectified linear unit (PReLU), a rectified linear unit (ReLU), a leaky rectified linear unit (LReLU), an exponential linear unit (eLU) and a scaled exponential linear unit (SeLU). In the example of FIG. 1, the non-linear operation is based on PReLU.

As is schematically illustrated in FIG. 1, the respective decoder layers, 7, 8, 9, mirror the encoder layers, 2, 3, 4. While the number of filters in each layer and the filter size in each layer may be the same in the decoder stage as in the encoder stage, up-sampling of the audio signal in the decoder stage may be performed by two alternative approaches. In one embodiment, fractionally-strided convolution (also known as transposed convolution) operations may be used in layers 7, 8, 9, of the decoder stage. Alternatively, in each layer of the decoder stage the filters may operate on the audio data input into each layer with a stride of 1, after up-sampling and interpolation is performed as in conventional signal processing with the up-sampling factor of 2.

An output layer (e.g., convolution layer), 10, may subsequently follow the last layer of the decoder stage before the enhanced audio data is output. In this example, the output layer, 10, may include $N_{out}=1$ filters having a filter size of 31.

In the output layer, 10, the activation may be different to the activation performed in the at least one of the encoder layers and the at least one of the decoder layers. The activation may be based, for example, on a tanh operation.

The output layer, 10, may be mirrored by an input layer, 1, before the first layer, 2, of the encoder stage.

In between the encoder stage and the decoder stage, the audio data may be modified. The modification may be based on the output of a bottleneck layer, 5, of the encoder stage that maps to a coded audio feature space, 6. The bottleneck layer (or rather, the coded audio feature space) captures the most dominant features of the input (coded) audio data.

A random noise vector, z, may additionally be used in the coded audio feature space, 6, for modifying audio. The modification in the coded audio feature space, 6, may be done, for example, by concatenating the random noise vector (z) with the vector representation (c) of the audio data as output from the bottleneck layer, 5. The random noise vector may be set to z=0 in some implementations. For coding artifact reduction setting the random noise vector to z=0 may yield the best results. Alternatively, or additionally, metadata may be input at this point to modify the audio data. In this, generation of the modified audio data may be conditioned based on given metadata, for example, companding metadata.

Skip connections, 11, may exist between homologous layers of the encoder stage and the decoder stage. Thereby, the coded audio feature space, 6, described above may be bypassed preventing loss of information. Skip connections, 11, may be implemented using one or more of concatenation and signal addition. Due to the implementation of skip connections, 11, the number of filter outputs may be "virtually" doubled. It is understood that the outermost layers of the encoder stage and the decoder stage are homologous to each other, that the next-to-outermost layers of the encoder stage and the decoder stage are homologous to each other, and so forth, up to the innermost layers.

Referring again to the non-limiting example in FIG. 1, the architecture of the generative neural network may be summarized as follows:

1/Input: dynamic range reduced raw audio data
2/encoder layer L=1: filter number N=16, filter size=31, activation=PreLU
3/encoder layer L=2: filter number N=32, filter size=31, activation=PreLU
.
.
.
4/encoder layer L=11: filter number N=512, filter size=31
5/bottleneck layer: filter number N=1024, filter size=31
6/coded audio feature space
7/decoder layer L=1: filter number N=512, filter size=31
.
.
.
8/decoder layer L=10: filter number N=32, filter size=31, activation PreLU
9/decoder layer L=11: filter number N=16, filter size=31, activation PreLU
10/output layer: filter number N=1, filter size=31, activation tanh
output: enhanced audio data
11/skip connections The above presented architecture merely represents an example. Depending on the intended application, the number of layers in the encoder stage and in the decoder stage of the generative neural network may be down-scaled or up-scaled, respectively.

In general, the above generative neural network architecture offers the possibility of one-shot artifact reduction, as no complex operation as in Wavenet or sampleRNN has to be performed.

Pruning

While deep learning in general and the use of generative neural networks in particular offer new opportunities for improving coded audio, these improvements may come at the expense of high computational complexity and network memory usage. As the use of deep neural networks becomes more widespread, increased focus needs to be put on how implementable they are on a wider variety of devices. These devices often include devices, such as mobile devices, with low enough processing power that the implementation of a high-complexity neural network has a significant impact on storage and computation resources.

Weight pruning allows for selectively setting weight values or weight coefficients (e.g., filter coefficients and/or activation coefficients in the one or more layers of a generative neural network) to zero to improve network memory usage while at the same time reducing the computational complexity of the generative neural network. One example of such generative neural network is a Generator trained in a GAN setup, as noted above.

In the context of the present disclosure, pruning may correspond to the zeroing of one or more weight coefficients of convolutional layers. Pruning a given convolutional layer may mean to prune applicable ones of the weight coefficients of that convolutional layer.

Pruning may be performed in accordance with pruning control information. The pruning control information governs (determines) the sensitivity of the pruning, such as the number or ratio of the weight coefficients that are pruned (zeroed). The pruning control information may indicate the severity of pruning individually for each of the convolutional layers of the generative neural network. In one example, the pruning control information comprises (or corresponds to) sensitivity parameters for the plurality of convolutional layers of the encoder stage and the decoder stage. Then, there may be one sensitivity parameter per convolutional layer. Each sensitivity parameter may set a ratio of weight coefficients that is to be pruned for the respective convolutional layer. Alternatively, each sensitivity parameter may set a respective threshold for pruning.

Methods and apparatus as described herein enable to improve network memory usage of a generative neural network (e.g., trained in a GAN setup) for post-processing of audio, optionally in combination with companding techniques. Such methods and apparatus can reduce the computational burden put upon devices implementing the generative neural network. Thereby, the weight pruning of a generative neural network provides the benefits of enabling audio enhancement by a generative neural network even when using complexity constrained devices.

Method for Determining Parameters of a Generative Neural Network

Figure 2:
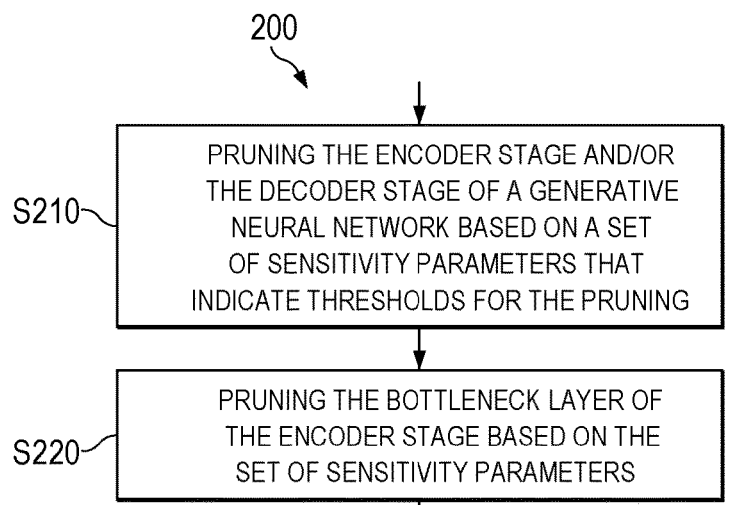
FIG. 2 is a flow diagram illustrating an example of a method of determining parameters of a generative neural network according to embodiments of the disclosure.

Next, a first method for determining (parameters of) a generative neural network will be described. Specifically, FIG. 2 shows a flow diagram of an example of a method 200 for determining (parameters of) a generative neural network (e.g., Generator of a GAN) usable for post-processing of an audio signal. The method may essentially relate to training and/or pruning the generative neural network. The generative neural network includes an encoder stage and a decoder stage. The encoder stage and the decoder stage each include a plurality of layers with one or more filters in each layer. Each filter includes one or more weights (e.g., filter coefficients and/or activation coefficients). A bottleneck layer of the encoder stage of the generative neural network maps to a coded (audio) feature space between the encoder stage and the decoder stage. The generative neural network may, for example, have the architecture as described above in connection with FIG. 1.

In step S210, the encoder stage and/or the decoder stage of the generative neural network are pruned based on a set of sensitivity parameters that indicate thresholds for the pruning.

Further, in step S220, the bottleneck layer of the encoder stage is pruned based on the set of sensitivity parameters. The set of sensitivity parameters, as used herein, may refer to sensitivity parameters that are provided for every parameter of the generative neural network for which pruning is desired. Steps S210 and S220 may be performed in any order, serially, or in parallel. In some implementations, steps S210 and S220 may be even seen as relating to a single step of pruning that affects both the encoder stage, including the bottleneck layer, and/or the decoder stage.

In an embodiment, the pruning includes zeroing one or more weights (weight coefficients) based on the set of sensitivity parameters. Weights, as stated above, correspond to or may be said to be the filter coefficients of the one or more filters in each layer of the encoder stage and the decoder stage of the generative neural network. In this context, a sensitivity parameter may be a scalar which indicates the percentage of the weights that are to be pruned (e.g., in terms/units) of standard deviations for the distribution of the weights), or may indicate thresholds below which the weights are to be set to zero (i.e., weights below the threshold may be set to zero). These weights may include convolution (and transposed convolution) layer weights and activation weights.

In general, pruning may involve using an algorithm to decide which weights in a network (e.g., generative neural network) contribute the least to the accuracy of that model, and effectively set those weights to zero. The accuracy of the model may be interpreted as the quality or effectiveness of the perceived audio quality enhancement, and how much, if at all, audio quality drops when pruning is applied. In an embodiment, this may be evaluated by a listening test. The listening test may be an automated listening test, for example based on predefined quality measures.

In an embodiment, the method may further include pruning, based on the set of sensitivity parameters, one or more layers of the encoder stage and/or the decoder stage adjacent to the bottleneck layer. The set of sensitivity parameters may be chosen such that an increase in sparsity of the bottleneck layer is less than the increase in sparsity of either of the one or more pruned layers of the encoder stage and/or the decoder stage (i.e., less or less severe pruning is performed in the bottleneck layer). In this regard, it is noted that pruning in the outer layers of the generative neural network may have a disproportionately negative impact on the perceived audio quality in comparison with pruning on the deeper layers. Deeper layers contain more weights and thus reducing accuracy in the outer layers may cascade to greater errors deeper in the generative neural network. Furthermore, generally, the first layer in a convolutional model is likely to learn to process analogously to traditional signal processing structures, e.g., filter-banks.

For example, pruning may thus be performed by allocating a sensitivity parameter of 0.3 (e.g., assuming that weights are normalized to the range [0,1]) for any layer with more than a threshold number of weights (e.g., for any layer with more than a threshold number of one million weights), except for the bottleneck layer. As the bottleneck layer captures the most dominant features of the input audio data, the sensitivity parameter of the bottleneck layer may be selected in such a way that the bottleneck layer is made less sparse than the neighboring (adjacent) inner/deeper layers of the generative neural network. In other words, the sensitivity parameter of the bottleneck layer is not a (direct) result of the amount of pruning of the adjacent layers, but may have to be carefully selected/determined individually in view of audio quality loss. Further, the sensitivity parameter may be selected in such a way to make the bottleneck layer sparser than the outer layers of the generative neural network, i.e. the first layers of the encoder stage and/or the last layers of the decoder stage (but less sparse that the inner layers of the generative neural network). In some implementations, the sensitivity parameter as a function of layer number, starting from the outermost layer of the encoder stage, may monotonously change towards values indicating more severe pruning, up to the layer before the bottleneck layer, may then for the bottleneck layer take a value indicating less severe pruning, may change again to a value indicating more severe pruning for the innermost (deepest) layer of the decoder stage, and may then monotonously change, from said innermost layer of the decoder stage to the outermost layer of the decoder stage, towards values indicating less severe pruning. Summarizing, in yet other words, more pruning may be applied to the deeper layers of the generative neural network than to its outer layers, but the bottleneck layer may be pruned less than the directly adjacent layers in the encoder stage and the decoder stage, respectively.

Moreover, in an embodiment, a number of pruned layers in the encoder stage may be lower than the number of pruned layers in the decoder stage. Noting that the generative neural network generates the output signal (e.g., enhanced audio data) from the latent space representation (e.g., the coded audio feature space, optionally concatenated with a noise vector z), pruning fewer layers in the encoder stage than in the decoder stage may ensure that the pruned generative neural network can generate a good latent space representation that accurately captures perceptually relevant information. Moreover, when the generative neural network comprises skip connections from the encoder stage to the decoder stage, the decoder stage will have a higher number of coefficients (weight coefficients) than the encoder stage. This provides for additional leeway in pruning the decoder stage without affecting perceptual quality of the output signal.

In an embodiment, the method may further comprise a step of performing a sensitivity analysis on the plurality of layers of the encoder stage and the decoder stage and the bottleneck layer of the encoder stage to obtain the set of sensitivity parameters.

A sensitivity analysis may include providing a predetermined range of sensitivity parameters to assay for (try out) desired components of the generative neural network. In an embodiment, the sensitivity analysis may be performed on the plurality of layers of the encoder stage and the decoder stage and the bottleneck layer of the encoder stage of a second instance of the generative neural network, wherein the second instance of the generative neural network is a trained and unpruned generative neural network. The aim of the sensitivity analysis is to determine the amount of pruning for the different components of the generative neural network so that the final trained and pruned generative neural network provides a listening result that is perceptually indistinguishable from the result provided by the trained and unpruned generative neural network.

In this, the sensitivity analysis may take a pre-trained model and perform pruning at specified intervals to create a set of differently pruned generative neural networks. A loss function may further allow to provide a total loss estimate between the pruned generative neural networks and the unpruned generative neural network. The loss function may be a mean squared error (MSE) function, for example. Other types of loss functions may be used and are within the scope of the disclosure. For example, the loss could be computed in either time-domain or frequency-domain (e.g. with multi-resolution STFTs as described in equation 3), or both. Based on a comparison between the pruned generative neural networks and the unpruned generative neural networks, the set of sensitivity parameters to be applied may then be selected.

Figure 3A:
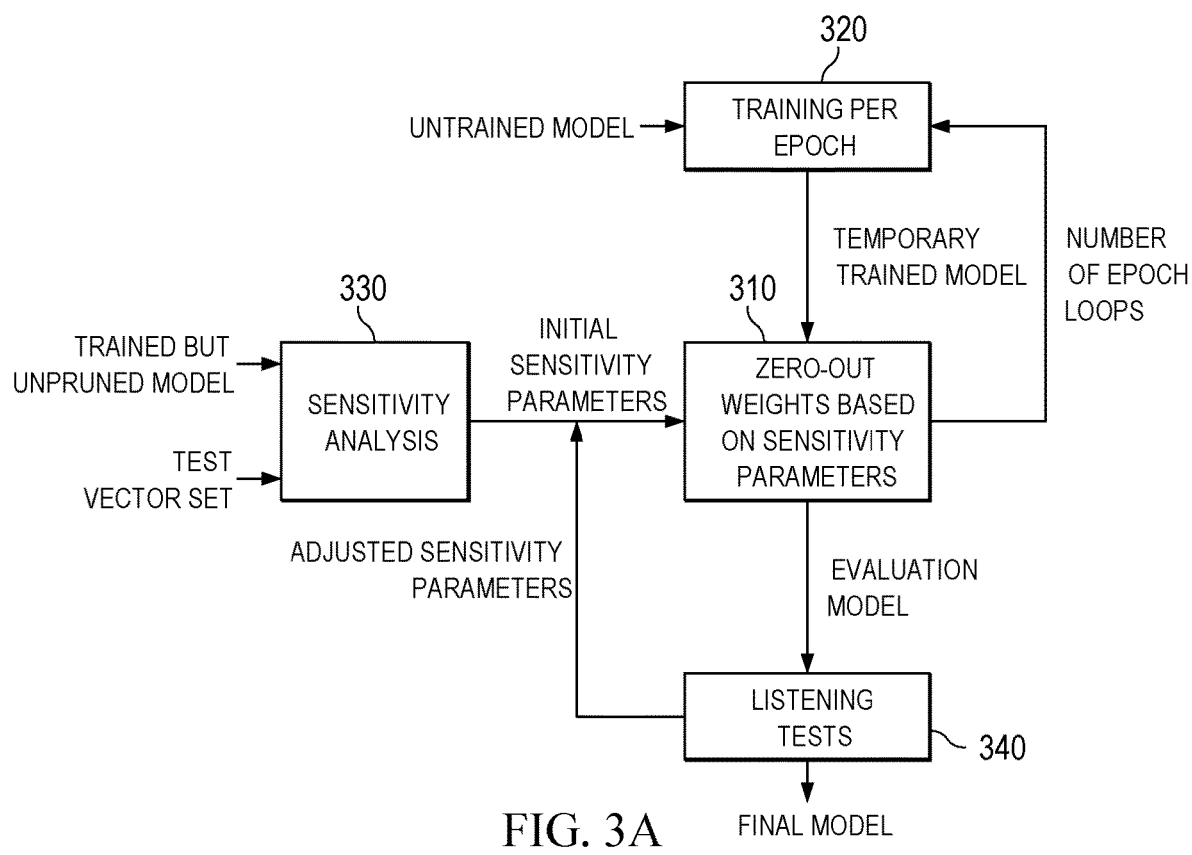
FIG. 3A is a block diagram schematically illustrating another example of a method of determining parameters of a generative neural network according to embodiments of the disclosure, FIG. 3B schematically illustrates an example of a sparsity profile of a pruned generative neural network according to embodiments of the disclosure, FIG. 4 schematically illustrates an example of a Generative Adversarial Network setting for training a generative neural network, FIG. 5 schematically illustrates an example of a Generative Adversarial Network setting for training a Discriminator.

Referring now to the example of FIG. 3A, a process flowchart of an example of a method for determining (parameters of) a generative neural network (e.g., Generator in a GAN setup) is illustrated. The illustrated process flow may involve performing a sensitivity analysis, 330, as described above, to determine an (initial) set of sensitivity parameters for pruning. In an embodiment, performing the steps of pruning the encoder stage and/or the decoder stage of the generative neural network based on the set of sensitivity parameters that indicate thresholds for the pruning and pruning the bottleneck layer of the encoder stage based on the set of sensitivity parameters (zeroing out weights based on sensitivity parameters) may correspond to a pruning pass, 310. The method may further include performing one or more cycles of a pruning pass, 310, alternating with one or more training passes, 320, for example training passes of a GAN setting. The initial input to the training pass, 320, may relate to a fully untrained generative neural network, or to a partially trained generative neural network, for example a generative neural network that has already been trained for a certain number of epochs. It is further to be noted that the initially input generative neural network may be first subjected to a pruning pass, 310, before it is subjected to a training pass, 320.

Details of training passes in a GAN setting are described further below. In an embodiment, in a GAN setting, performing the pruning pass, 310, may involve pruning the Generator, but may not involve pruning the Discriminator of the GAN setting. While the number of pruning passes and training passes (epochs) in one cycle is not limited, a pruning pass may be performed alternating with every second training pass (i.e., two training passes (two epochs) are followed by a pruning pass). Any feasible combination of pruning passes and training passes (epochs) in one cycle is within the scope of the disclosure.

In an embodiment, the method may further comprise performing a listening test, 340, after a plurality of cycles of pruning passes alternating with training passes. Performing the listening test allows the performance of the trained and pruned generative neural network to be evaluated with regard to coding artifact reduction and to ensure that the output of the trained and pruned generative neural network sounds as good as the output of the trained and unpruned generative neural network. In an embodiment, performing the listening test may thus involve comparing the output of the trained and pruned generative neural network with the output of the second instance of the (trained and unpruned) generative neural network. In this, the quality of the enhanced audio output from the trained and pruned generative neural network may be evaluated in comparison to the trained and unpruned generative neural network. If the quality of the enhanced audio output from the trained and pruned generative neural network matches the audio quality generated by the trained and unpruned generative neural network, this generative neural network may be taken as the final trained and pruned generative neural network for post-processing of audio signals. If the quality of the enhanced audio output from the trained and pruned generative neural network is found to be insufficient as compared to the trained and unpruned generative neural network (second instance of the generative neural network), the set of sensitivity parameters is adjusted based on a result of the listening test and the cycles of pruning and training passes are repeated anew, for example starting with an untrained and unpruned generative neural network. In this, the listening test, 340, may be a listening test by a human listener, or may be an automated listening test applying a predefined quality metric. Also combinations of human (subjective listening) and automated listening (objective quality predictor) tests may be feasible.

Figure 3B:
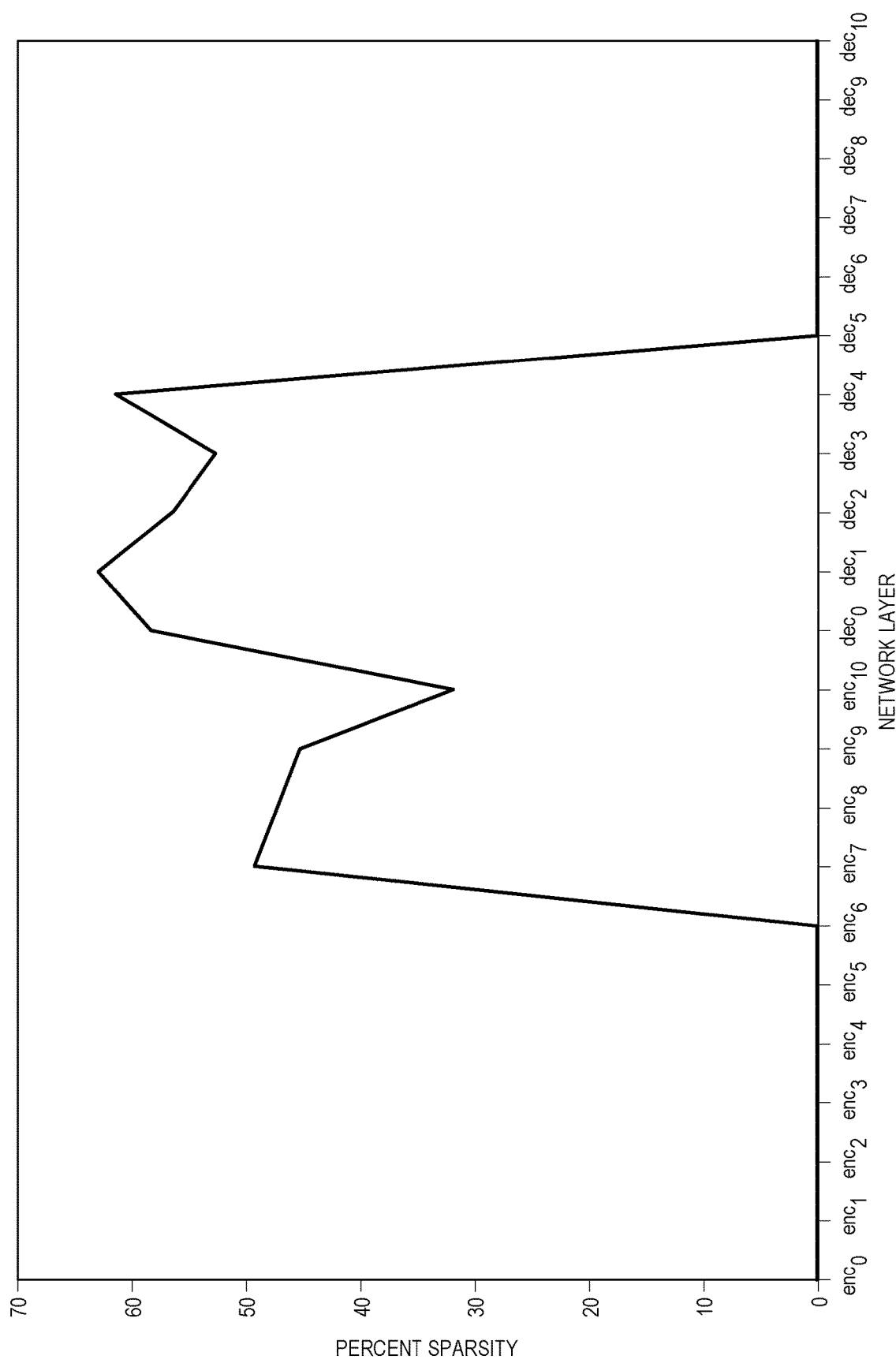

As noted above, the sensitivity parameter may be selected in such a way to make the bottleneck layer sparser than the outer layers of the generative neural network, i.e. the first layers of the encoder stage and/or the last layers of the decoder stage, but less sparse than the layers directly adjacent to the bottleneck layer. An example of a possible sparsity profile that indicates a sparsity as a function of layer number is indicated in FIG. 3B. This graph shows the percentage of zeroed-out (or zero valued) weights for each layer of the generative neural network, starting from the outermost layer of the encoder stage ($enc_0$ in the present example) up to the outermost layer of the decoder stage ($dec_{10}$ in the present example). This percentage monotonously increases up to the innermost layer of the encoder stage before the bottleneck layer ($enc_9$ in the present example). The percentage drops at the bottleneck layer ($enc_{10}$ in the present example), takes a higher value again for the innermost (deepest) layer of the decoder stage ($dec_1$ in the present example), and monotonously decreases from there. In general, the aforementioned percentage of zero valued weights (or sparsity) may be greater than a certain threshold value (sparsity threshold value) for at least one layer of the encoder stage (other than the bottleneck layer) and at least one layer of the decoder stage, and may be smaller than that certain threshold value for the bottleneck layer. For example, the certain threshold value may be between 35% and 45%, between 40% and 50%, or between 50% and 60%.

As can also be seen from the example of FIG. 3B, sparsity (and correspondingly, a severity of pruning) may be higher for the decoder stage than for the encoder stage. In some embodiments, a maximum value of sparsity in the decoder layer (about 65% in the present example) may be greater than a maximum value of sparsity in the encoder layer (about 50% in the present example), with both these values higher than a value of sparsity for the bottleneck layer (about 35% in the present example). The reason is, as noted above, that the generative neural network generates the output signal (e.g., enhanced audio data) from the latent space representation (e.g., the coded audio feature space, optionally concatenated with a noise vector z). Therefore, perceptual quality of the output signal of the generative neural network depends on how accurately the latent space representation captures the perceptually relevant information of the input signal (e.g., raw audio data or dynamic range reduced raw audio data). Then, applying less pruning to the encoder stage than to the decoder stage can contribute to ensuring that the pruned generative neural network can generate a sufficiently accurate latent space representation. In addition, an overall higher number of coefficients (weight coefficients) in the decoder stage in the presence of skip connections from the encoder stage to the decoder stage will also provide for additional leeway in pruning the decoder stage without affecting perceptual quality of the output signal.

Generative Adversarial Network Setting

In an embodiment, the one or more training passes may be performed in the dynamic range reduced domain in a GAN setting, wherein the GAN setting comprises the Generator and a Discriminator. While in this implementation, training passes are performed in the dynamic range reduced domain, it is, however, noted that other conditions may apply depending on the use case. In this sense, operating in the dynamic range reduced domain (e.g., companded domain, perceptually weighted domain) is optional. The training passes will now be described with reference to the examples of FIG. 4 and FIG. 5.

The dynamic range reduced domain may be an AC-4 companded domain, for example. In some cases (such as in AC-4 companding, for example), dynamic range reduction may be equivalent to removing (or suppressing) the temporal envelope of the signal. Thus, it may be said that the generative neural network may be a generative neural network trained in a domain after removing the temporal envelope from the signal. Moreover, while in the following paragraphs a GAN setting will be described, it is noted that this is not to be understood in a limiting sense and that also other generative models are conceivable and included in the scope of the present disclosure.

A GAN setting generally includes the Generator G and a Discriminator D that are trained by an iterative process. During training in the Generative Adversarial Network setting, the Generator G generates an enhanced dynamic range reduced audio training signal x* based on a raw dynamic range reduced audio training signal, x̃, (core encoded and core decoded) derived from an original dynamic range reduced audio signal, x. Dynamic range reduction may be performed by applying a companding operation. The companding operation may be a companding operation as specified for the AC-4 codec and performed in an AC-4 encoder. It is understood that the GAN setting may be applied to any kind of audio processing, not limited to enhancing (core) decoded audio. Further, it is understood that dynamic range reduction is optional.

In an embodiment, a random noise vector, z, may be input into the Generator in addition to the dynamic range reduced raw audio training signal, x̃, and generating, by the Generator, the enhanced dynamic range reduced audio training signal, x*, may be based additionally on the random noise vector, z. The random noise vector may, however, be set to z=0. For coding artifact reduction setting the random noise vector to z=0 may be best, especially for not too low bitrates. In some embodiments, the decision whether to input a random noise vector or to set the noise vector to z=0 may be determined based on the bitrate or other characteristics of an audio bitstream including the original dynamic range reduced audio signal. For example, in case of a stereo signal, the random noise vector, z, may be used for 36 kbit/s or lower. For applause, the random noise vector, z, may be used for all bit rates. Alternatively, training may be performed without the input of a random noise vector z.

Alternatively, or additionally, in one embodiment, metadata may be input into the Generator and enhancing the dynamic range reduced raw audio training signal, x̃, may be based additionally on the metadata. During training, the generation of the enhanced dynamic range reduced audio training signal, x*, may thus be conditioned based on the metadata. In one embodiment, the metadata may include one or more items of companding control data. In one embodiment, the companding control data may include information on a companding mode among one or more companding modes used for encoding audio data. In one embodiment, the companding modes may include the companding mode of companding ON, the companding mode of companding OFF and the companding mode of AVERAGE COMPANDING. In one embodiment, generating, by the Generator, the enhanced dynamic range reduced audio training signal may depend on the companding mode indicated by the companding control data. In this, during training, the Generator may be conditioned on the companding modes. In one embodiment, if the companding mode is companding OFF, this may indicate that the input raw audio signal is not dynamic range reduced and enhancing by the Generator may not be performed in this case. Companding control data may be detected during encoding of audio data and enable to selectively apply companding in that companding is switched ON for transient signals, switched OFF for stationary signals and AVERAGE COMPANDING is applied where appropriate.

During training, the Generator tries to output an enhanced audio training signal (e.g., enhanced dynamic range reduced audio training signal), x*, that is indistinguishable from the original audio signal (e.g., original dynamic range reduced audio signal), x. The Discriminator is one at a time fed with the generated enhanced audio training signal, x*, and the original audio signal, x, and judges (e.g., by labeling the input signal as fake/real, or by attributing a confidence score to the input signal) whether the input signal is the enhanced audio training signal, x*, or the original audio signal, x. In this, the Discriminator tries to discriminate the original audio signal, x, from the enhanced audio training signal, x*. During the iterative process, the Generator then tunes its parameters to generate better and better enhanced audio training signals, x*, as compared to the original audio signals, x, and the Discriminator learns to better judge/ discriminate between the enhanced audio training signals, x*, and the original audio signals, x.

It shall be noted that the Discriminator may be trained first in order to train the Generator in a subsequent, final step. Training and updating the Discriminator may also be performed in the dynamic range reduced domain. Training and updating the Discriminator may involve maximizing the probability of assigning high scores (high likelihood of correspondence to a "real" signal) to original audio signals (e.g., original dynamic range reduced audio signals), x, and low scores (low likelihood of correspondence to a "real" signal) to enhanced audio training signals (e.g., enhanced dynamic range reduced audio training signals), x*. The goal in training the Discriminator may be that the original audio signal (e.g., original dynamic range reduced audio signal), x, is recognized as real while the enhanced audio training signal (e.g., enhanced dynamic range reduced audio training signal), x*, (generated signal) is recognized as fake. While the Discriminator is trained and updated, the parameters of the Generator may be kept fixed (indicated by the bold lines around the Generator, G, in FIG. 5).

Training and updating the Generator may involve or amount to minimizing the difference between the original audio signal, x, and the generated enhanced audio training signal, x*. The goal in training the Generator may be to achieve generation of such enhanced audio training signals, x*, that the Discriminator recognizes the generated enhanced audio training signals, x*, as real.

Referring now to the example of FIG. 4, training of a Generator, G, 12, in the dynamic range reduced domain in a Generative Adversarial Network setting is described in more detail. As noted above, transforming the involved signals to the dynamic range reduced domain is optional, and the example of FIG. 4 is not to be understood in a limiting sense in this regard. Training of the Generator, G, 12, may involve the following.

An original audio signal, $x_{ip}$, 23, may be subjected to dynamic range reduction, comp, 21, to obtain a dynamic range reduced original audio signal, x, 20. The dynamic range reduction may be performed by applying a companding operation, in particular, an AC-4 companding operation followed by a QMF (quadrature mirror filter) synthesis step. Details on companding will be described below. As the companding operation is performed in the QMF-domain, the subsequent QMF synthesis step is required. Before inputting into the Generator, G, 12, the dynamic range reduced original audio signal, x, 20, may be additionally subjected to core encoding and core decoding to obtain a dynamic range reduced raw audio training signal, x̃, 19. This may emulate the degradation that an audio signal undergoes in the encoder-decoder chain in an actual application. The dynamic range reduced raw audio training signal, x̃, 19, and a random noise vector, z, 22, are then input into the Generator G, 12. Based on the input, the Generator, G, 12, generates in the dynamic range reduced domain the enhanced dynamic range reduced audio training signal, x*, 18. In an embodiment, the random noise vector, z, 22, may be set to z=0. That is, alternatively, training may be performed without input of a random noise vector, z, 22.

Alternatively, or additionally, the Generator, G, 12, may be trained using metadata as input in a dynamic range reduced coded audio feature space to modify the enhanced dynamic range reduced audio training signal, x*, 18. One at a time, the original dynamic range reduced audio signal, x, 20, from which the dynamic range reduced raw audio training signal, x̃, 19, has been derived, and the generated enhanced dynamic range reduced audio training signal, x*,

18, are input, 17, into the Discriminator, D, 13. As additional information, also the dynamic range reduced raw audio training signal, x̃, 19, may be input each time into the Discriminator D, 13. The Discriminator D, 13 then judges, 14, 15, whether the input signal is the enhanced dynamic range reduced audio training signal, x*, 18, (i.e., fake) or the original dynamic range reduced audio signal, x, 20, (i.e., real).

In a next step, the parameters of the Generator, G, 12, are then tuned until the Discriminator, D, 13, can no longer distinguish the enhanced dynamic range reduced audio training signal, x*, 18, from the original dynamic range reduced audio signal, x, 20. This may be done in an iterative process, 16. The iterative process may involve back-propagation of errors through the neural network, as is known to the skilled person.

Judging by the Discriminator may be based on one or more of a perceptually motivated objective function as according to the following Eq. (1), $$\min_G V_{LS-GAN}(G) = \frac{1}{2} \mathbb{E}_{z \sim p_z(z), \tilde{x} \sim p_{data}(\tilde{x})} [(D(x^*, \tilde{x}) - 1)^2] + \lambda \|x^* - x\|_1 \quad (1)$$

The above objective function may correspond to a loss equation (loss function) or error equation (error function) given by $$\mathcal{L}_G = \frac{1}{2} \mathbb{E}_{z \sim p_z(z), \tilde{x} \sim p_{data}(\tilde{x})} [(D(x^*, \tilde{x}) - 1)^2] + \lambda \|x^* - x\|_1 \quad (2)$$

The first term of the loss function may correspond to an adversarial loss, whereas the second term corresponds to a time-domain L1-norm loss.

The index LS in Eq. (1) refers to the incorporation of a least squares approach. In addition, as can be seen from the first term in Eq. (1), a conditioned Generative Adversarial Network setting has been applied by inputting the core decoded dynamic range reduced raw audio training signal, as additional information into the Discriminator.

Especially with the introduction of the last term in the above Eq. (1), it can be ensured during the iterative process that lower frequencies are not disrupted as these frequencies are typically coded with a higher number of bits. The last term is a 1-norm distance scaled by the factor lambda λ. The value of lambda may be chosen for example from a value range between 10 to 100 depending on the application and/or signal length that is input into the Generator, G, 12. For example, lambda may be chosen to be λ=100.

Another option for a loss function is a loss function including a loss computed in the frequency domain. An example is given by $$\mathcal{L}_G = \frac{1}{2} \mathbb{E}_{z \sim p_z(z), \tilde{x} \sim p_{data}(\tilde{x})} [(D(x^*, \tilde{x}) - 1)^2] + \lambda \|x^* - x\|_1 + \mu \frac{1}{M} \sum_{m=1}^{M} L_{sc}^m(x, x^*) + \vartheta \frac{1}{M} \sum_{m=1}^{M} L_{mag}^m(x, x^*) \quad (3)$$

The first two terms in Eq. (3) correspond to those in Eq. (2). The last two terms in Eq. (3) may be referred to as a multi-resolution STFT loss terms. The scaling (μ and/or ϑ) for the multi-resolution STFT loss terms may be set, for example, to the same value as λ. Contrary to the first two terms, the multi-resolution STFT losses may be calculated in the frequency domain. The multi-resolution STFT loss may be said to be the sum of different STFT-based loss functions using different STFT parameters. $L_{sc}^m$ (spectral convergence loss) and $L_{mag}^m$ (log-scale STFT magnitude loss) may apply the STFT-based loss at M different resolutions with number of FFT bins∈ {512, 1024, 2048}, hop sizes∈ {50, 120, 240}, and lastly window lengths∈ {240, 600, 1200}, respectively. Results have shown that for handling general audio (i.e. any content type), the multi-resolution STFT loss terms provides quality improvement. Specifically, the multi-resolution STFT loss terms can reduce tonal artifacts for high-sparsity pruning and can help to retain high-frequency components.

In general, the loss function may further comprise, in addition to the adversarial loss and/or the time-domain L1-norm loss, one or more components corresponding to a frequency-domain loss. The frequency-domain loss may be a multi-resolution Short-Time Fourier Transform, STFT, loss, for example. Other perceptually-motivated losses can be incorporated as well.

Referring now to the example of FIG. 5, training of the Discriminator, D, 13, for example in the dynamic range reduced domain, in the Generative Adversarial Network setting may follow the same general iterative process, 24, as described above for the training of the Generator, G, 12, in response to inputting, one at a time, 25, the enhanced dynamic range reduced audio training signal x*, 18, and the original dynamic range reduced audio signal, x, 20, together with the dynamic range reduced raw audio training signal, x̃, 19, into the Discriminator, D, 13, except that in this case the parameters of the Generator, G, 12, may be fixed while the parameters of the Discriminator, D, 13, may be varied (indicated by the bold lines around the Generator, G, in FIG. 5 as compared to FIG. 4). The training of the Discriminator, D, 13, may be described by the following Eq. (4) that enables the Discriminator, D, 13 to determine enhanced dynamic range reduced audio training signals, x*, 18, as fake:

$$\min_D V_{LS-GAN}(D) = \frac{1}{2} \mathbb{E}_{x, \tilde{x} \sim p_{data}(x, \tilde{x})} [(D(x, \tilde{x}) - 1)^2] + \frac{1}{2} \mathbb{E}_{z \sim p_z(z), \tilde{x} \sim p_{data}(\tilde{x})} [(D(x^*, \tilde{x}))^2] \quad (4)$$

In the above case, also the least squares approach (LS) and a conditioned Generative Adversarial Network setting has been applied by inputting the core decoded dynamic range reduced raw audio training signal, x̃, as additional information into the Discriminator.

Besides the least squares approach, also other training methods may be used for training the Generator and the Discriminator in a Generative Adversarial Network setting in the dynamic range reduced domain. The present disclosure is not limited to a particular training method. Alternatively, or additionally, the so-called Wasserstein approach may be used. In this case, instead of the least squares distance, the Earth Mover Distance, also known as Wasserstein Distance, may be used. In general, different training methods make the training of the Generator and the Discriminator more stable. The kind of training method applied, does, however, not impact the architecture of the Generator.

It is understood that a set of training data may include a plurality of audio samples (e.g., frames) x relating to music, speech, and/or effects, for example, and possibly corresponding degraded (e.g., core encoded and core decoded)

audio samples x̃. It is further understood that an item of training data may relate to a an audio sample x and possibly the corresponding degraded audio sample x̃.

Discriminator Architecture

While the architecture of the Discriminator is not limited, the architecture of the Discriminator may follow the same one-dimensional convolutional structure as the encoder stage of the generative neural network described above. The Discriminator architecture may thus mirror the encoder stage of the generative neural network. The Discriminator may thus also include a plurality of layers with one or more filters in each layer. For example, the Discriminator may include a number of L layers, wherein each layer may include a number of $N_l$ filters, l=1, ..., L. L may be a natural number $\geq 1$ and $N_l$ may be natural numbers $\geq 1$. The size of the $N_l$ filters in respective layers is not limited and may also be chosen according to the requirements of the Discriminator. The filter size may, however, be the same in each of the L layers. A non-linear operation performed in at least one of the encoder layers of the Discriminator may include LeakyReLU.

Following the encoder stage, the Discriminator may include an output layer. The output layer may have $N_{out}=1$ filters having a filter size of 1. In this, the filter size of the output layer may be different from the filter size of the encoder layers. The output layer may thus be a one-dimensional convolution layer that does not down-sample hidden activations. This means that the filter in the output layer may operate with a stride of 1 while all previous layers of the encoder stage of the Discriminator may use a stride of 2. Alternatively, each of the filters in the previous layers of the encoder stage may operate with a stride of 4. This may enable to halve the overall number of layers in the Discriminator.

The activation in the output layer may be different from the activation in the at least one of the encoder layers. The activation may be sigmoid. However, if a least squares training approach is used, sigmoid activation may not be required and is therefore optional.

The architecture of the Discriminator may exemplarily be summarized as follows:
  input: enhanced dynamic range reduced audio training signal or original dynamic range reduced audio signal
  encoder layer L=1: filter number N=16, filter size=31, activation=Leaky ReLU
  encoder layer L=2: filter number N=32, filter size=31, activation=Leaky ReLU
  encoder layer L=11: filter number N=1024, filter size=31, activation=Leaky ReLU
  output layer: filter number N=1, filter size=1, optionally: activation=sigmoid
  Output: judgement on the input as real/fake in relation to the original dynamic range reduced audio signal and the enhanced dynamic range reduced audio training signal generated by the Generator.

The above presented architecture merely represents an example. Depending on the intended application, the number of layers in the encoder stage of the Discriminator may be down-scaled or up-scaled, respectively.

Referring again to the example of FIG. 3A, in an embodiment, performing the pruning pass in a GAN setup may involve pruning the Generator, but may not involve pruning the Discriminator. This may be attributed to the fact that the operation of the Discriminator corresponds to a judging operation while audio enhancement is performed by the Generator, only.

Companding

Companding techniques, as described for example in U.S. Pat. No. 9,947,335 B2, which is incorporated herein by reference in its entirety, achieve temporal noise shaping of quantization noise in an audio codec through use of a companding algorithm implemented in the QMF (quadrature mirror filter) domain to achieve temporal shaping of quantization noise. In general, companding is a parametric coding tool that operates in the QMF domain that may be used for controlling the temporal distribution of quantization noise (e.g., quantization noise introduced in the MDCT (modified discrete cosine transform) domain). As such, companding techniques may involve a QMF analysis step, followed by application of the actual companding operation/algorithm, and a QMF synthesis step.

Companding may be seen as an example technique that reduces the dynamic range of a signal, and equivalently, that removes a temporal envelope from the signal. Methods, apparatus and systems described herein may aim at improving the quality of audio in a reduced dynamic range domain. Such improvements may thus be in particular valuable for application with companding techniques. Some embodiments thus relate to companding and, in particular, to improving the quality of audio in the QMF domain as the dynamic range reduced domain.

Nevertheless, it is to be noted that dynamic range reduction such as by companding is optional in the context of the present disclosure.

Another example of a dynamic range reduced domain is a perceptually weighted domain. An example of such perceptually weighted domain is described in U.S. Provisional Application No. 63/092,118 titled "Method and Apparatus for Processing of Audio using a Neural Network" filed on Oct. 15, 2020, which is hereby incorporated by reference in its entirety.

Method of Generating Enhanced Audio Data from a Low-Bitrate Audio Bitstream

Figure 6:
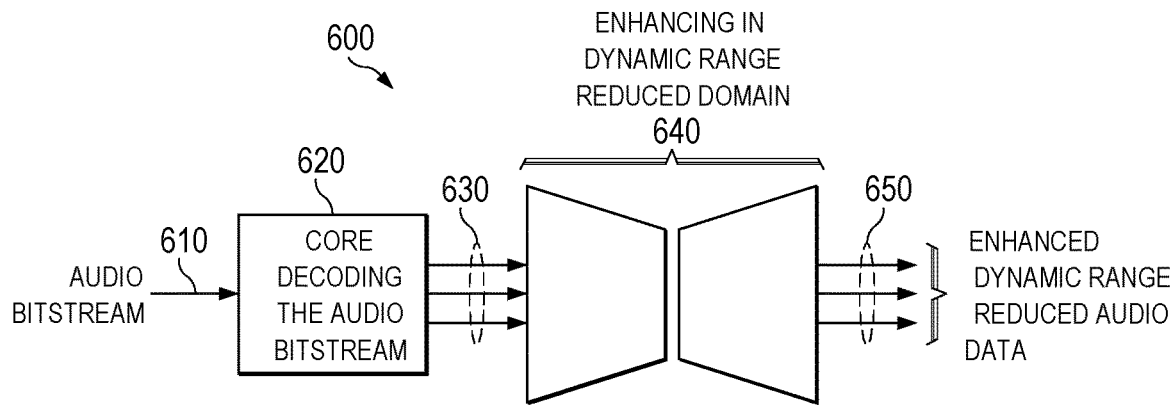
FIG. 6 is a block diagram schematically illustrating an example of a method of generating enhanced audio data from a low-bitrate audio bitstream according to embodiments of the disclosure.

Referring to the example of FIG. 6, a method 600 of generating, for example in a dynamic range reduced domain, enhanced audio data from a low-bitrate audio bitstream is illustrated. Dynamic range reduction may be optional in the context at hand.

In a first step, 610, a low-bitrate audio bitstream is received. The codec used for generating the low-bitrate audio bitstream is not limited and may be any codec used in lossy audio compression, for example AAC (Advanced Audio Coding), AC3, HE-AAC, USAC or AC-4. In an embodiment, the low-bitrate audio bitstream may be in AC-4 format.

In a second step, 620, the low-bitrate audio bitstream is core decoded and raw audio data (e.g., dynamic range reduced raw audio data) is obtained based on the low-bitrate audio bitstream. For example, the low-bitrate audio bitstream may be core decoded to obtain dynamic range reduced raw audio data based on the low-bitrate audio bitstream. The term core decoded, as used herein, generally refers to decoded audio after waveform coding in the MDCT-domain. In AC-4, the core codec is known as Audio Spectral Frontend (ASF) or Speech Spectral Frontend (SSF). Dynamic range reduced audio data may be encoded in the low bitrate audio bitstream. Alternatively, dynamic range reduction may be performed prior to or after core decoding the low-bitrate audio bitstream.

The dynamic range reduced raw audio data is input into a generative neural network for processing the dynamic range reduced raw audio data in step 630.

The generative neural network, as described above, may be a Generator of a Generative Adversarial Network, GAN. The generative neural network includes an encoder stage and a decoder stage, wherein the encoder stage and the decoder stage each include a plurality of layers with one or more filters in each layer, wherein each filter includes one or more weights, wherein a bottleneck layer of the encoder stage of the generative neural network maps to a coded audio feature space between the encoder stage and the decoder stage, and wherein one or more layers of the encoder stage and/or the decoder stage adjacent to the bottleneck layer are more sparse than the bottleneck layer.

In an embodiment, the bottleneck layer may be sparser than one or more outer layers of the encoder stage and/or the decoder stage. Outer layers may refer to the first layers of the encoder stage or the last layers of the decoder stage.

In an embodiment, sparsity may be determined by a percentage of zero-valued weights, wherein the one or more layers of the encoder stage and/or the decoder stage adjacent to the bottleneck layer may have a higher percentage of zero-valued weights than the bottleneck layer.

In an embodiment, the one or more layers of the encoder stage and/or the decoder stage adjacent to the bottleneck layer that are more sparse than the bottleneck layer may have a threshold number of weights. For example, the threshold number may be one million weights.

In an embodiment, the generative neural network may have been obtained by pruning, wherein the pruning may include zeroing one or more weights based on a set of sensitivity parameters.

In an embodiment, obtaining the generative neural network by pruning may further include pruning, based on the set of sensitivity parameters, one or more layers of the encoder stage and/or the decoder stage adjacent to the bottleneck layer. The set of sensitivity parameters may be chosen such that an increase in sparsity of the bottleneck layer is less than the increase in sparsity of either of the one or more pruned layers of the encoder stage and/or the decoder stage.

In this regard, it is noted that pruning in the outer layers of the generative neural network may have a disproportionately negative impact on the perceived audio quality in comparison with pruning on the deeper layers. Deeper layers contain more weights and thus reducing accuracy in the outer layers may cascade to greater errors deeper in the generative neural network. Furthermore, generally, the first layer in a convolutional model is likely to learn to process analogously to traditional signal processing structures, e.g. filter-banks. As the bottleneck layer captures the most dominant features of the input audio data, the sensitivity parameter of the bottleneck layer may be selected in such a way that the bottleneck layer is made less sparse than the neighboring (adjacent) deeper layers of the generative neural network. In other words, the sensitivity parameter of the bottleneck layer is not a (direct) result of the amount of pruning of the adjacent layers, but has to be carefully selected/determined individually in view of audio quality loss. Further, the sensitivity parameter may be selected in such a way to make the bottleneck layer more sparse than the outer layers of the generative neural network, i.e. the first layers of the encoder stage and/or the last layers of the decoder stage.

In step 640, the dynamic range reduced raw audio data is then enhanced by the generative neural network in the dynamic range reduced domain. The enhancement process performed by the generative neural network is intended to enhance the quality of the raw audio data by reducing coding artifacts and quantization noise.

As an output in step 650, enhanced dynamic range reduced audio data is obtained for subsequent expansion to an expanded domain. In one embodiment, the method may further include the step of expanding the enhanced dynamic range reduced audio data to the expanded dynamic range domain by performing an expansion operation. In one embodiment, the expansion operation may be a (de-)companding operation based on a p-norm of spectral magnitudes for calculating respective gain values.

In companding (compression/expansion) in general, gain values for compression and expansion are calculated and applied in a filter-bank. A short prototype filter may be applied to resolve potential issues associated with the application of individual gain values. Referring to the above companding operation, the enhanced dynamic range reduced audio data as output by the generative neural network may be analyzed by a filter-bank and a wideband gain may be applied directly in the frequency domain. According to the shape of the prototype filter applied, the corresponding effect in time domain is to naturally smooth the gain application. The modified frequency signal is then converted back to the time domain in the respective synthesis filter bank. In this context, it is to be noted that there may be many QMF tools which may be subsequently run prior to converting from QMF back to the time domain including in a nonlimiting manner one or more of bandwidth extension and parametric upmixing. Analyzing a signal with a filter bank provides access to its spectral content, and allows the calculation of gains that preferentially boost the contribution due to the high frequencies, (or to boost contribution due to any spectral content that is weak), providing gain values that are not dominated by the strongest components in the signal, thus resolving problems associated with audio sources that comprise a mixture of different sources. In this context, the gain values may be calculated using a p-norm of the spectral magnitudes where p is typically less than 2, which has been found to be more effective in shaping quantization noise, than basing on energy as for p=2.

The above described method may be implemented on any decoder. If the above method is applied in conjunction with companding, the above described method may be implemented on an AC-4 decoder.

The above method may also be carried out by an apparatus for generating, in a dynamic range reduced domain, enhanced audio data from a low-bitrate audio bitstream. The apparatus may include a receiver for receiving the low-bitrate audio bitstream, a core decoder for core decoding the received low-bitrate audio bitstream to obtain dynamic range reduced raw audio data based on the low-bitrate audio bitstream, and a generative neural network (e.g., Generator) for enhancing the dynamic range reduced raw audio data in the dynamic range reduced domain. In one embodiment, the apparatus may further include a demultiplexer. In one embodiment, the apparatus may further include an expansion unit.

Alternatively, or additionally, the apparatus may be part of a system of an apparatus for applying dynamic range reduction to input audio data and encoding the dynamic range reduced audio data in a bitstream at a low bitrate and said apparatus for generating, in a dynamic range reduced domain, enhanced audio data from a low-bitrate audio bitstream.

Alternatively, or additionally, the methods as described herein may be implemented by a computer program product comprising a computer-readable storage medium with instructions adapted to cause the device to carry out said methods when executed by a device having processing capability.

Alternatively, or additionally, the methods as described herein may be implemented by a system of an apparatus for generating, in a dynamic range reduced domain, enhanced audio data from a low-bitrate audio bitstream and a Generative Adversarial Network comprising a Generator and a Discriminator.

Metadata

The above method may involve or be partially based on metadata. In one embodiment, the received low-bitrate audio bitstream may include metadata and step 610, as described above, may further include demultiplexing the received low-bitrate audio bitstream. In one embodiment, in step 640 described above, enhancing the dynamic range reduced raw audio data by the generative neural network may be based on the metadata. As stated above, methods, apparatus and systems as described herein may be valuable if applied in conjunction with companding. In one embodiment, the metadata may thus include one or more items of companding control data. Companding in general may provide benefit for speech and transient signals, while degrading the quality of some stationary signals as modifying each QMF time slot individually with a gain value may result in discontinuities during encoding that, at the companding decoder, may result in discontinuities in the envelope of the shaped noise leading to audible artifacts. By respective companding control data, it is possible to selectively switch companding ON for transient signals and OFF for stationary signals or to apply average companding (AVERAGE COMPANDING mode) where appropriate. Average companding, in this context, refers to the application of a constant gain to an audio frame resembling the gains of adjacent active companding frames. The companding control data may be detected during encoding and transmitted via the low-bitrate audio bitstream to the decoder. In one embodiment, the companding control data may thus include information on a companding mode among one or more companding modes that had been used for encoding the audio data. In one embodiment, the companding mode may include the companding mode of companding on, the companding mode of companding off and the companding mode of average companding. In one embodiment, in step 640 described above, enhancing the dynamic range reduced raw audio data by the generative neural network may depend on the companding mode indicated in the companding control data. In one embodiment, if the companding mode is companding OFF, enhancing by the generative neural network may not be performed.

Adaptive Sensitivity-Based Pruning

A first method of determining parameters for a computer-implemented generative neural network has been described above with reference to, for example, FIG. 3A. In this first method, there is only limited adaptation of the pruning sensitivity parameters, including for instance selecting sensitivity parameters based on intuition, deep learning theory, listening, and manual repetition.

A second method of determining parameters for a (computer-implemented) generative neural network that comprises automatic adaptation of sensitivity parameters is described next with reference to FIG. 7A, FIG. 7B, and FIG. 8. Unless indicated otherwise, this second method is a method of determining parameters for a computer-implemented (deep) generative neural network for processing audio signals. As such, the method may be suitable for configuring the generative neural network. The generative neural network may be a Generator of a GAN, for example. As described above, the generative neural network comprises an encoder stage and a decoder stage, with the encoder stage mapping to a coded feature space (latent feature space, e.g., coded audio feature space or latent audio feature space). Each of the encoder stage and the decoder stage comprises a plurality of convolutional layers, and each convolutional layer comprises one or more weight coefficients (e.g., filter coefficients and/or activation function coefficients).

Generally speaking, the proposed method solves the problem of laborious sensitivity parameter selection by the automatic update of sensitivity parameters based on a loss calculated during training epochs. As such, the present disclosure presents a framework for automatically updating sensitivity parameters to prune a deep generative neural network (e.g., a Generator of a GAN) usable for enhancing audio.

In more detail, the present disclosure describes a method of pruning weights for convolutional layers of a generative model (e.g., generative neural network) by automatically updating the sensitivity parameter based on the unpruned loss of the generative model. This method takes the loss of the unpruned, fully trained, generative model ("target loss"), and automatically updates the sensitivity parameters based on a loss calculated during training epochs. The loss function used may vary and may have different loss components incorporated. For example, components for computing loss in the time domain, frequency domain, or perceptual domain may be incorporated.

Thereby, the techniques presented in this section can reduce the computational requirements needed for operating generative neural networks for audio enhancement on memory and battery constrained devices, allowing for the potential of widespread deployment of generative neural networks for audio enhancement on said devices.

Figure 7A:
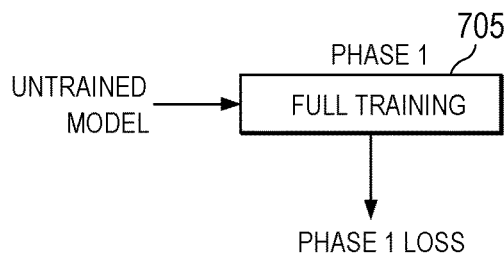
FIG. 7A and FIG. 7B are block diagrams illustrating another example of a method of determining parameters of a generative neural network according to embodiments of the disclosure.
Figure 7B:
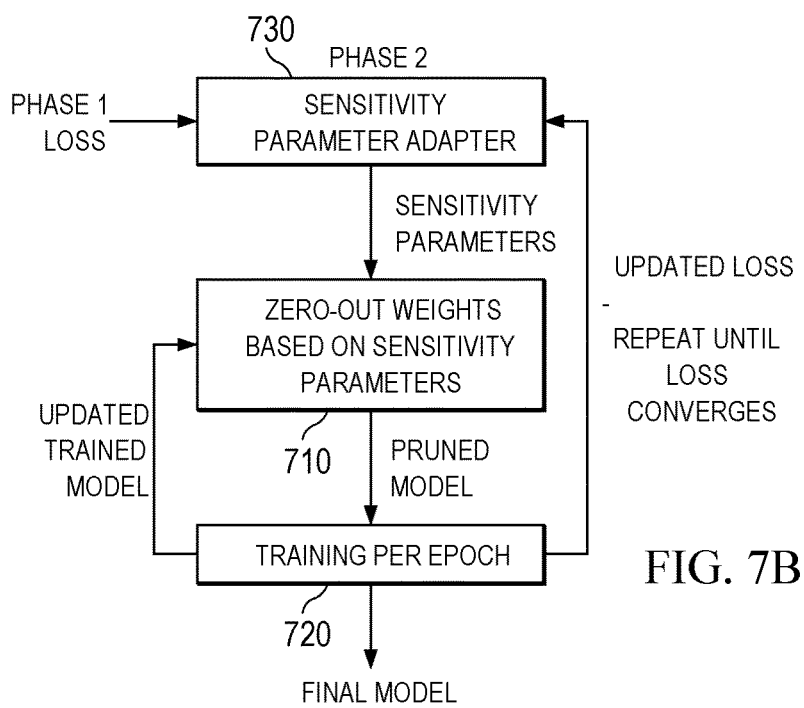

Without intended limitation, important aspects of the proposed method are the following:

Automatic adaptation of parameters (e.g., sensitivity parameters etc.) governing the total number of neural network weights to be pruned Use of optimization techniques for converging to an array of optimal pruning meta-parameters during training New loss equations for improving pruning loss estimation with loss computed in both time- and frequency-domain Loss terms could be computed in a perceptually weighted domain FIG. 7A and FIG. 7B are block diagrams illustrating an example of a method of determining parameters of a generative neural network that involves automatic adaptation of a severity of pruning according to embodiments of the disclosure. As will be described in more detail below, the adaptation of the severity of the pruning is based on a target loss (or reference loss) of the generative neural network. The target loss may be determined (e.g., calculated) using a predetermined loss function. Any of the loss functions described above may be used for this purpose.

One example procedure for determining the target loss is shown in FIG. 7A. Accordingly, in a first phase, a second instance of the generative neural network is fully trained at full training block 705, using an appropriate set of training data. Here, second instance of the generative neural network means that the architecture of the second instance of the generative neural network is the same as that of the (first instance of the) generative neural network that is to be configured by the proposed method. However, the parameter values of the second instance of the generative neural network may be different from the parameter values of the generative neural network. Full training may mean, for example, training for such number of epochs that a certain criterion or convergence criterion for full training is met. After full training, a predetermined loss function is used to determine a loss ("phase 1 loss") for the fully trained second instance of the generative neural network, e.g., based on an item of training data, or based on a plurality of items of training data. The loss determined in this manner can then be used as the target loss for configuring the generative neural network. It is understood herein that the second instance of the generative neural network is not pruned.

The actual method of determining the parameters of the generative neural network may be independent of the aforementioned first phase, and it is noted that the target loss may be determined by alternative procedures as well.

After the target loss has been determined, the parameters of the generative neural network can be determined in a second phase, an example of which is shown in FIG. 7B.

The second phase assumes initially set pruning control information, such as an initial set of sensitivity parameters. In a non-limiting example, the initially set pruning control information may be derived using the aforementioned fully trained second instance of the generative neural network. For instance, the fully trained second instance of the generative neural network can be used for performing a sensitivity analysis on the plurality of convolutional layers of the encoder stage and the decoder stage of the trained second instance of the generative neural network, to thereby obtain (e.g., derive) the initial set of pruning control information.

Regardless of its origin, in one non-limiting example the pruning control information may be initially chosen such that it indicates pruning of the bottleneck layer as well as pruning of one or more convolutional layers of the encoder stage and/or the decoder stage adjacent to the bottleneck layer. Further, the initially chosen pruning control information may be such that an increase in sparsity of the bottleneck layer is less than the increase in sparsity of the one or more pruned layers of the encoder stage and/or the decoder stage adjacent to the bottleneck layer. Additionally or alternatively, the initially chosen pruning control information may be such that it indicates pruning less layers in the encoder stage than in the decoder stage.

FIG. 7B schematically illustrates a loop (or cycle) that may be repeatedly executed for a plurality of times in the process of determining the parameters of the generative neural network. The first of these loops may be slightly different in that it may start with either pruning the generative neural network at block 710 or training the generative neural network at block 720. In any case, after an initial phase of the method, the loop shown in FIG. 7B may be repeatedly run through. Moreover, it is noted that the adaptation/updating of pruning control information at block 730 (described below) may be started at the beginning of the training/pruning process, or at some later epoch. In the latter case, the generative neural network that enters the training/pruning process may be a (partially) pre-trained generative neural network. This may accelerate convergence of the training/pruning process shown in FIG. 7B.

In each loop, the current generative neural network (i.e., the generative neural network in its current state of training and/or pruning) is pruned at block 710, which is a block of zeroing out weights (weight coefficients, or parameters in general) of the generative neural network based on pruning control information. Sensitivity parameters are one example of pruning control information. The output of block 710 is a pruned generative neural network (or pruned model in general).

The pruned generative neural network is subsequently trained at block 720. This (deep learning based) training is based on an appropriate set of training data and may span one or more epochs. Therein, more or fewer training epochs could be employed based on a variability (e.g., change rate) of the pruning control information (or the loss determined below). Further, the training may involve back propagation of errors through the generative neural network, as is common practice in training of deep learning based models. In one example, the generative neural network may be a Generator of a GAN and may be trained in a GAN setup, as described above.

Depending on whether, for example, a convergence criterion or other criterion indicating a final version of the generative neural network is met, the output of block 720 may be either the final generative neural network (or final model in general), or the generative neural network may be subjected to one or more additional loops of pruning and training.

In the latter case, a (representative) loss is determined for the current generative neural network, using a loss function (e.g., the same loss function as had been used for determining the target loss). This loss ("updated loss") is fed to block 730, which implements a sensitivity parameter adapter (or pruning control information adapter in general). Block 730 further receives the target loss ("phase 1 loss") as input and adapts the pruning control information based on the loss determined for the current generative neural network and the target loss. This adaptation may involve a comparison of the two losses. Potentially, many permutations of (adaptations of), for example, sensitivity parameters may be attempted at this stage, subject to constraints on overall training time. Any suitable optimization technique may be employed for this purpose. In general, adapting the pruning control information may involve increasing or decreasing pruning sensitivity for the plurality of convolutional layers of the generative neural network, based on the comparison of the losses. For instance, the pruning sensitivity may be increased for all convolutional layers alike, or decreased for all convolutional layers alike, depending on the outcome of the comparison. This may involve, for example, applying a scaling factor (e.g., overall scaling factor) to the pruning control information (e.g., to the sensitivity parameters) to increase (e.g., uniformly increase) or decrease (e.g., uniformly decrease) pruning sensitivity for the plurality of convolutional layers of the generative neural network. Here, uniform increase/decrease is understood to not alter the shape of a pruning profile across layers (e.g., a profile of resulting sparsity or sparsity increase across layers). It is further understood that severity of pruning may be decreased if the determined loss (or the loss difference) is great and/or that the severity of pruning may be increased if the determined loss (or the loss difference) is small.

Subsequently, the updated pruning control information output by block 730 and the generative neural network ("updated trained model") output by block 720 are input to block 710 for another pass of pruning.

Figure 8:
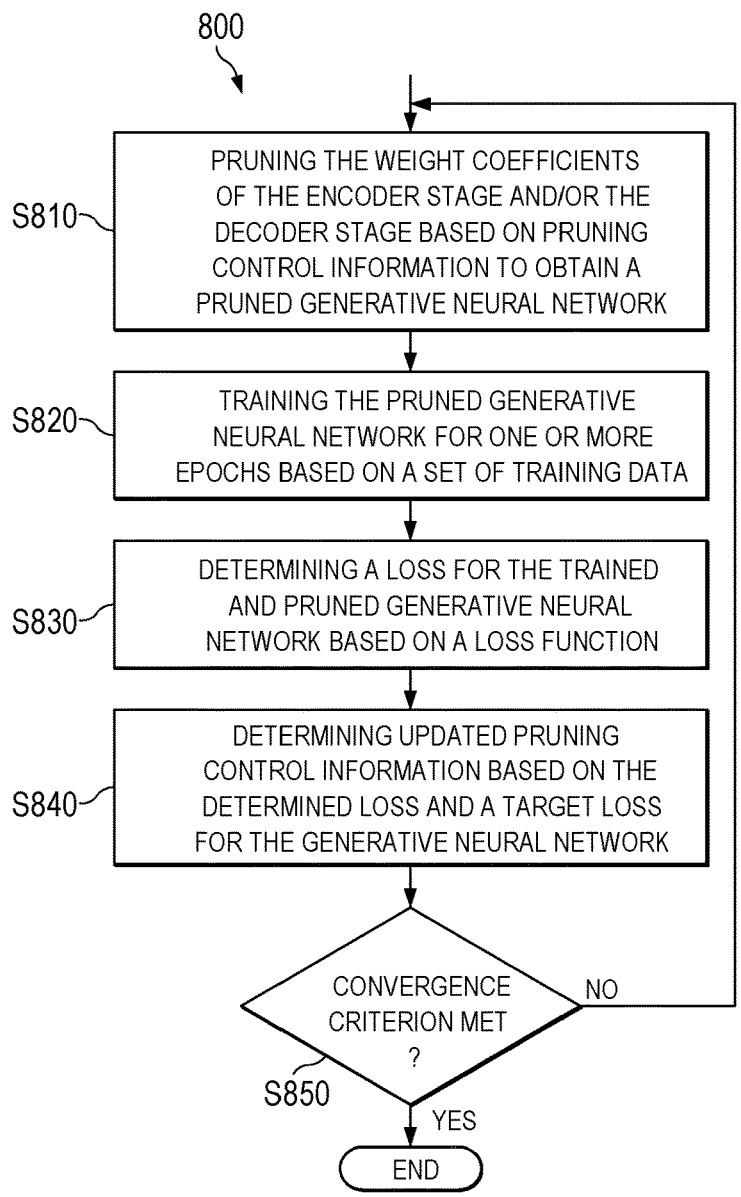
FIG. 8 is a flow diagram illustrating another example of a method of determining parameters of a generative neural network according to embodiments of the disclosure, and FIG. 9 schematically illustrates an example of an apparatus for carrying out methods according to embodiments of the disclosure.

An example flowchart of a method 800 of determining parameters for a computer-implemented generative neural network for processing an audio signal is illustrated in FIG. 8. Method 800 may be in line with the method of FIG. 7B. The overall method 800 may comprise plural cycles of steps S810 to S850 that are cycled through in loop-like manner.

For example, steps S810 to S850 may be cycled through for a plurality of times until a convergence criterion is met.

At step S810, the weight coefficients of the encoder stage and/or the decoder stage are pruned (zeroed) based on pruning control information to obtain a pruned generative neural network. As noted above, the pruning control information may govern (e.g., determine, indicate) the number of weight coefficients that are pruned for respective convolutional layers. This step may correspond to block 710 described above.

At step S820, the pruned generative neural network is trained for one of more epochs based on an appropriate set of training data. Here, the number of epochs for training in each instance of this step may be set based on a rate of change of the pruning control information (or the determined loss) from one cycle to the next. High variability (large changes/change rate) of the pruning control information (or determined loss) may indicate that fewer epochs of training per training step would be sufficient, whereas low variability of the pruning control information (or determined loss) may indicate that more epochs of training per training step are advisable. This step may correspond to block 720 described above.

At step S830, a loss is determined for the trained and pruned generative neural network based on a loss function. Without intended limitation, this loss function may correspond to any of the loss functions described above in section Generative Adversarial Network Setting. Further, additional/new loss components may be incorporated into the loss calculation for better perceptual significance.

At step S840, updated/adjusted pruning control information is determined based on the determined loss and a target loss for the generative neural network. The target loss may have been determined (e.g., calculated) as described above with reference to FIG. 7A, using the same loss function as in step S830. Any loss function as described throughout the disclosure, especially section Generative Adversarial Network Setting, may be used for this purpose.

Here, the updated pruning control information may be determined so as to minimize a difference between the determined loss and the target loss. Various optimization techniques may be used for this purpose. For instance, determining the updated pruning control information may comprise increasing (e.g., uniformly increasing) or decreasing (e.g., uniformly decreasing) pruning sensitivity for the plurality of convolutional layers of the generative neural network.

That is, the pruning sensitivity may be increased for all convolutional layers alike, or decreased for all convolutional layers alike. This may be achieved for example by applying a scaling factor (e.g., uniform scaling factor) to the pruning control information (e.g., sensitivity parameters) to increase or decrease pruning sensitivity for the plurality of convolutional layers of the generative neural network. In this case, the increase or decrease of pruning sensitivity (e.g., in terms of a ratio between updated and previous pruning sensitivity) may be uniform across all convolutional layers. Here, uniform increase or decrease is understood to indicate that the (shape of the) pruning profile (e.g., in terms of resulting sparsity or sparsity increase) across the layers of the generative neural network does not change. This step may correspond to block 730 described above.

At step S850, it is checked whether a predefined convergence criterion is met. If so (YES at step S850), the method ends. Otherwise (NO at step S850), the method returns to step S810 for another run through the cycle comprising steps S810 to S850.

Thus, cycles comprising steps S810 to S850 may be repeatedly looped through until the convergence criterion is met. Alternatively, the check of steps S850 may be performed after steps S810, S820, in which case steps S830, S840 would be performed (only) if the convergence criterion is not met. Other suitable orders of steps may be feasible as well. In general, it is understood that the pruning control information is continuously updated as long as the convergence criterion is not met.

The aforementioned convergence criterion may be based on the loss determined at step S830 and the target loss. For example, the convergence criterion may relate to whether a difference between the determined loss and the target loss is below a predetermined threshold. Alternatively or additionally, the convergence criterion may relate to whether a change, from one cycle to the next, of the difference between the determined loss and the target loss is below a predetermined threshold.

In some embodiments, the method 800 may further comprise an additional pre-training step (not shown in FIG. 8) prior to entering the plurality of cycles of steps S810 to S850. This pre-training step may be a step of (partially) training the generative neural network using the set of training data for one or more epochs without pruning the weight coefficients of the encoder stage and the decoder stage. This may result in faster convergence of the generative neural network when performing alternating passes of pruning and training (e.g., at steps S810 and S820).

Example Computing Device

Figure 9:
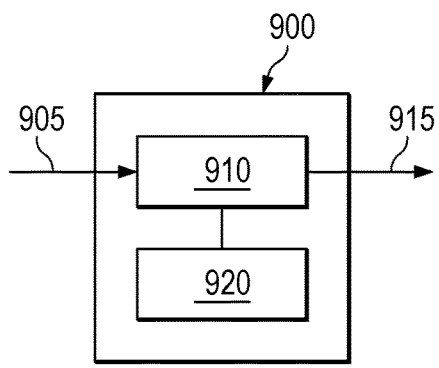

A method of determining parameters of a computer-implemented generative neural network has been described above. Additionally, the present disclosure also relates to an apparatus (e.g., system or device) for carrying out this method. An example of such apparatus 900 is shown in FIG. 9. The apparatus 900 comprising a processor 910 and a memory 920 coupled to the processor 910, wherein the processor is adapted to carry out the steps of the method(s) described herein. The processor 910 may receive an input 905 (e.g., a representation of the generative neural network, training data, test data, metadata, etc.) and generate an output 915 (e.g., the parameters of the generative neural network).

These aforementioned apparatus (and their stages, units, blocks, etc.) may be implemented by a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, while only a single apparatus 900 is illustrated in the figures, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not be limited to, data repositories in the form of solid-state memories, optical media, and magnetic media, for example.

Interpretation and Additional Configuration Considerations

The present disclosure relates to methods of audio processing and apparatus (e.g., systems or devices) for audio processing. It is understood that any statements made with regard to the methods and their steps likewise and analogously apply to the corresponding apparatus and their stages/blocks/units, and vice versa.

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present disclosure may be appreciated from the following enumerated example embodiments (EEEs), which are not claims.

EEE1. A method for determining a Generator of a Generative Adversarial Network, GAN, for post-processing of an audio signal, wherein the Generator includes an encoder stage and a decoder stage, wherein the encoder stage and the decoder stage each include a plurality of layers with one or more filters in each layer, wherein each filter includes one or more weights, and wherein a bottleneck layer of the encoder stage of the Generator maps to a coded audio feature space between the encoder stage and the decoder stage, wherein the method includes the steps of: (a) pruning the encoder stage and/or the decoder stage based on a set of sensitivity parameters that indicate thresholds for the pruning; and (b) pruning the bottleneck layer of the encoder stage based on the set of sensitivity parameters.

EEE2. The method according to EEE1, wherein the pruning includes zeroing one or more weights based on the set of sensitivity parameters.

EEE3. The method according to EEE1 or 2, wherein the method further includes pruning, based on the set of sensitivity parameters, one or more layers of the encoder stage and/or the decoder stage adjacent to the bottleneck layer; and wherein the set of sensitivity parameters is chosen such that an increase in sparsity of the bottleneck layer is less than the increase in sparsity of either of the one or more pruned layers of the encoder stage and/or the decoder stage.

EEE4. The method according to EEE3, wherein a number of pruned layers in the encoder stage is less than the number of pruned layers in the decoder stage.

EEE5. The method according to any one of the preceding EEEs, further comprising a step of:

performing a sensitivity analysis on the plurality of layers of the encoder stage and the decoder stage and the bottleneck layer of the encoder stage to obtain the set of sensitivity parameters.

EEE6. The method according to EEE5, wherein the sensitivity analysis is performed on the plurality of layers of the encoder stage and the decoder stage and the bottleneck layer of the encoder stage of a second Generator of the GAN, wherein the second Generator is a trained and unpruned Generator.

EEE7. The method according to any one of the preceding EEEs, wherein performing step (a) and step (b) corresponds to a pruning pass, and wherein the method further includes performing one or more cycles of a pruning pass alternating with one or more training passes of a GAN setting.

EEE8. The method according to EEE7, wherein the one or more training passes are performed in the dynamic range reduced domain in the GAN setting, wherein the GAN setting comprises the Generator and a Discriminator.

EEE9. The method according to EEE8, wherein the one or more training passes include the steps of: (a) inputting a dynamic range reduced raw audio training signal into the Generator; (b) generating, by the Generator, an enhanced dynamic range reduced audio training signal based on the dynamic range reduced raw audio training signal; (c) inputting, one at a time, the enhanced dynamic range reduced audio training signal and a corresponding original dynamic range reduced audio signal, from which the dynamic range reduced raw audio training signal has been derived, into the Discriminator; (d) judging, by the Discriminator, whether the input dynamic range reduced audio signal is the enhanced dynamic range reduced audio training signal or the original dynamic range reduced audio signal; and (e) tuning the parameters of the Generator until the Discriminator can no longer distinguish the enhanced dynamic range reduced audio training signal from the original dynamic range reduced audio signal.

EEE10. The method according to any of EEEs 7 to 9, further comprising performing a listening test after a plurality of cycles of pruning passes alternating with training passes.

EEE11. The method according to EEE10, wherein performing the listening test involves comparing the output of the trained and pruned Generator with the output of the second Generator.

EEE12. The method according to any one of EEEs 7 to 11, wherein performing the pruning pass involves pruning the Generator, but does not involve pruning the Discriminator.

EEE13. A method of generating, in a dynamic range reduced domain, enhanced audio data from a low-bitrate audio bitstream, wherein the method includes the steps of: (a) receiving the low-bitrate audio bitstream; (b) core decoding the low-bitrate audio bitstream and obtaining dynamic range reduced raw audio data based on the low-bitrate audio bitstream; (c) inputting the dynamic range reduced raw audio data into a Generator of a Generative Adversarial Network, GAN, for processing the dynamic range reduced raw audio data, wherein the Generator includes an encoder stage and a decoder stage, wherein the encoder stage and the decoder stage each include a plurality of layers with one or more filters in each layer, wherein each filter includes one or more weights, wherein a bottleneck layer of the encoder stage of the Generator maps to a coded audio feature space between the encoder stage and the decoder stage, and wherein one or more layers of the encoder stage and/or the decoder stage adjacent to the bottleneck layer are more sparse than the bottleneck layer; (d) enhancing the dynamic range reduced raw audio data by the Generator in the dynamic range reduced domain; and (e) obtaining, as an output from the Generator, enhanced dynamic range reduced audio data for subsequent expansion of the dynamic range.

EEE14. The method according to EEE13, wherein the bottleneck layer is more sparse than one or more outer layers of the encoder stage and/or the decoder stage.

EEE15. The method according to EEE13 or 14, wherein sparsity is determined by a percentage of zero-valued weights, and wherein the one or more layers of the encoder stage and/or the decoder stage adjacent to the bottleneck layer have a higher percentage of zero-valued weights than the bottleneck layer.

EEE16. The method according to any one of EEEs 13 to 15, wherein the one or more layers of the encoder stage and/or the decoder stage adjacent to the bottleneck layer that are more sparse than the bottleneck layer have a threshold number of weights.

EEE17. The method according to any one of EEEs 13 to 16, wherein the Generator has been obtained by pruning, and wherein the pruning includes zeroing one or more weights based on a set of sensitivity parameters.

EEE18. The method according to EEE17, wherein obtaining the Generator by pruning further includes pruning, based on the set of sensitivity parameters, one or more layers of the encoder stage and/or the decoder stage adjacent to the bottleneck layer; and wherein the set of sensitivity parameters is chosen such that an increase in sparsity of the bottleneck layer is less than the increase in sparsity of either of the one or more pruned layers of the encoder stage and/or the decoder stage.

EEE19. The method according to any one of EEEs 13 to 18, wherein the low-bitrate audio bitstream is in AC-4 format.

EEE20. The method according to any one of EEEs 13 to 19, wherein the method further includes the step of (0 expanding the enhanced dynamic range reduced audio data to the expanded dynamic range domain by performing an expansion operation.

EEE21. The method according to EEE20, wherein the expansion operation is a companding operation based on a p-norm of spectral magnitudes for calculating respective gain values.

EEE22. The method according to any one of EEEs 13 to 21, wherein the received low-bitrate audio bitstream includes metadata and step (a) further includes demultiplexing the received low-bitrate audio bitstream.

EEE23. The method according to EEE22, wherein in step (d) enhancing the dynamic range reduced raw audio data by the Generator is based on the metadata.

EEE24. The method according to EEE23, wherein the metadata include one or more items of companding control data.

EEE25. The method according to EEE24, wherein the companding control data include information on a companding mode among one or more companding modes that had been used for encoding the audio data.

EEE26. The method according to EEE25, wherein the companding modes include the companding mode of companding on, the companding mode of companding off and the companding mode of average companding.

EEE27. The method according to EEE25 or 26, wherein in step (d) enhancing the dynamic range reduced raw audio data by the Generator depends on the companding mode indicated by the companding control data.

EEE28. The method according to EEE27, wherein, if the companding mode is companding off, enhancing by the Generator is not performed.

EEE29. An apparatus for generating, in a dynamic range reduced domain, enhanced audio data from a low-bitrate audio bitstream, wherein the apparatus includes: (a) a receiver for receiving the low-bitrate audio bitstream; (b) a core decoder for core decoding the received low-bitrate audio bitstream and obtaining dynamic range reduced raw audio data based on the low-bitrate audio bitstream; and (c) a Generator of a Generative Adversarial Network, GAN, for enhancing the dynamic range reduced raw audio data in the dynamic range reduced domain, wherein the Generator includes an encoder stage and a decoder stage, wherein the encoder stage and the decoder stage each include a plurality of layers with one or more filters in each layer, wherein each filter includes one or more weights, wherein a bottleneck layer of the encoder stage of the Generator maps to a coded audio feature space between the encoder stage and the decoder stage, and wherein one or more layers of the encoder stage and/or the decoder stage adjacent to the bottleneck layer are more sparse than the bottleneck layer.

EEE30. The apparatus according to EEE29, wherein the bottleneck layer is more sparse than one or more outer layers of the encoder stage and/or the decoder stage.

EEE31. The apparatus according to EEE29 or 30, wherein sparsity is determined by a percentage of zero-valued weights, and wherein the one or more layers of the encoder stage and/or the decoder stage adjacent to the bottleneck layer have a higher percentage of zero-valued weights than the bottleneck layer.

EEE32. The apparatus according to any one of EEEs 29 to 31, wherein the one or more layers of the encoder stage and/or the decoder stage adjacent to the bottleneck layer that are more sparse than the bottleneck layer have a threshold number of weights.

EEE33. The apparatus according to any one of EEEs 29 to 32, wherein the Generator has been obtained by pruning, and wherein the pruning includes zeroing one or more weights based on a set of sensitivity parameters.

EEE34. The apparatus according to EEE33, wherein obtaining the Generator by pruning further includes pruning, based on the set of sensitivity parameters, one or more layers of the encoder stage and/or the decoder stage adjacent to the bottleneck layer; and wherein the set of sensitivity parameters is chosen such that an increase in sparsity of the bottleneck layer is less than the increase in sparsity of either of the one or more pruned layers of the encoder stage and/or the decoder stage.

EEE35. The apparatus according to any one of EEEs 29 to 34 further including a demultiplexer for demultiplexing the received low-bitrate audio bitstream, wherein the received low-bitrate audio bitstream includes metadata.

EEE36. The apparatus according to EEE35, wherein the metadata include one or more items of companding control data.

EEE37. The apparatus according to EEE36, wherein the companding control data include information on a companding mode among one or more companding modes that had been used for encoding the audio data.

EEE38. The apparatus according to EEE37, wherein the companding modes include the companding mode of companding on, the companding mode of companding off and the companding mode of average companding.

EEE39. The apparatus according to EEE37 or 38, wherein the Generator is configured to enhance the dynamic range reduced raw audio data in the dynamic range reduced domain depending on the companding mode indicated by the companding control data.

EEE40. The apparatus according to EEE39, wherein, if the companding mode is companding off, the Generator is configured not to perform enhancing.

EEE41. The apparatus according to any one of EEEs 29 to 40, wherein the apparatus further includes an expansion unit configured to perform an expansion operation to expand the enhanced dynamic range reduced audio data to an expanded dynamic range domain.

EEE42. A computer program product comprising a computer-readable storage medium with instructions adapted to cause the device to carry out the method according to any one of EEEs 1 to 12 when executed by a device having processing capability.

EEE43. A computer program product comprising a computer-readable storage medium with instructions adapted to cause the device to carry out the method according to any one of EEEs 13 to 28 when executed by a device having processing capability.

EEE44. A system of an apparatus for generating, in a dynamic range reduced domain, enhanced audio data from a low-bitrate audio bitstream and a Generative Adversarial Network comprising a Generator and a Discriminator, wherein the system is configured to perform the method according to any one of EEEs 1 to 28.

EEE45. A system of an apparatus for applying dynamic range reduction to input audio data and encoding the dynamic range reduced audio data in a bitstream at a low bitrate and an apparatus for generating, in a dynamic range reduced domain, enhanced audio data from a low-bitrate audio bitstream according to any one of EEEs 29 to 41.

The invention claimed is:

1. A method for determining a Generator of a Generative Adversarial Network, GAN, comprising:
    (a) pruning one or more layers of an encoder stage and/or a decoder stage of the Generator based on a set of sensitivity parameters that indicate thresholds for the pruning, wherein the encoder stage and the decoder stage each includes a respective plurality of layers with one or more filters in each layer, wherein each filter includes one or more weights, wherein the encoder stage is configured to map an audio signal to a coded audio feature space between the encoder stage and the decoder stage, and wherein the respective plurality of layers of the encoder stage includes a bottleneck layer configured to map to the coded audio feature space; and
    (b) pruning the bottleneck layer of the encoder stage based on the set of sensitivity parameters,
    wherein the pruning includes zeroing one or more weights based on the set of sensitivity parameters, and
    wherein the set of sensitivity parameters is chosen such that an increase in sparsity of the bottleneck layer is less than an increase in sparsity of either of the one or more pruned layers of the encoder stage and/or the decoder stage.

2. The method according to claim 1, wherein a number of pruned layers in the encoder stage is less than the number of pruned layers in the decoder stage.

3. The method according to claim 1, further comprising a step of:
    performing a sensitivity analysis on the plurality of layers of the encoder stage and the decoder stage and the bottleneck layer of the encoder stage to obtain the set of sensitivity parameters.

4. The method according to claim 3, wherein the sensitivity analysis is performed on the plurality of layers of the encoder stage and the decoder stage and the bottleneck layer of the encoder stage of a second Generator of the GAN, wherein the second Generator is a trained and unpruned Generator.

5. The method according to claim 1, wherein performing step (a) and step (b) corresponds to a pruning pass, and wherein the method further includes performing one or more cycles of a pruning pass alternating with one or more training passes of a GAN setting.

6. The method according to claim 5, wherein the one or more pruning passes are performed in the dynamic range reduced domain in the GAN setting, wherein the GAN setting comprises the Generator and a Discriminator.

7. The method according to claim 6, wherein the one or more pruning passes include the steps of:
inputting a dynamic range reduced raw audio training signal into the Generator;
generating, by the Generator, an enhanced dynamic range reduced audio training signal based on the dynamic range reduced raw audio training signal;
inputting, one at a time, the enhanced dynamic range reduced audio training signal and a corresponding original dynamic range reduced audio signal, from which the dynamic range reduced raw audio training signal has been derived, into the Discriminator;
judging, by the Discriminator, whether the input dynamic range reduced audio signal is the enhanced dynamic range reduced audio training signal or the original dynamic range reduced audio signal; and
tuning the parameters of the Generator until the Discriminator can no longer distinguish the enhanced dynamic range reduced audio training signal from the original dynamic range reduced audio signal.

8. A method of generating, in a dynamic range reduced domain, enhanced audio data from a low-bitrate audio bitstream, wherein the method includes the steps of:
(a) receiving the low-bitrate audio bitstream;
(b) core decoding the low-bitrate audio bitstream and obtaining dynamic range reduced raw audio data based on the low-bitrate audio bitstream;
(c) inputting the dynamic range reduced raw audio data into a Generator of a Generative Adversarial Network, GAN, for processing the dynamic range reduced raw audio data, wherein the Generator includes an encoder stage and a decoder stage, wherein the encoder stage and the decoder stage each include a plurality of layers with one or more filters in each layer, wherein each filter includes one or more weights, wherein a bottleneck layer of the encoder stage of the Generator maps to a coded audio feature space between the encoder stage and the decoder stage, wherein one or more layers of the encoder stage and/or the decoder stage adjacent to the bottleneck layer are more sparse than the bottleneck layer, and wherein the bottleneck layer is more sparse than one or more outer layers of the encoder stage and/or the decoder stage, wherein sparsity is determined by a percentage of zero-valued weights, and wherein the one or more layers of the encoder stage and/or the decoder stage adjacent to the bottleneck layer have a higher percentage of zero-valued weights than the bottleneck layer,
wherein the Generator is obtainable by pruning, wherein the pruning includes the steps of:
(i) pruning the encoder stage and/or the decoder stage based on a set of sensitivity parameters that indicate thresholds for the pruning; and
(ii) pruning the bottleneck layer of the encoder stage based on the set of sensitivity parameters,
and wherein the pruning includes zeroing one or more weights based on the set of sensitivity parameters;
(d) enhancing the dynamic range reduced raw audio data by the Generator in the dynamic range reduced domain;
(e) obtaining, as an output from the Generator, enhanced dynamic range reduced audio data for subsequent expansion of the dynamic range; and
(f) expanding the enhanced dynamic range reduced audio data to the expanded dynamic range domain by performing an expansion operation.

9. The method according to claim 8, wherein the one or more layers of the encoder stage and/or the decoder stage adjacent to the bottleneck layer that are more sparse than the bottleneck layer have a threshold number of weights.

10. The method according to claim 8, wherein obtaining the Generator by pruning further includes pruning, based on the set of sensitivity parameters, one or more layers of the encoder stage and/or the decoder stage adjacent to the bottleneck layer;
wherein the set of sensitivity parameters is chosen such that an increase in sparsity of the bottleneck layer is less than the increase in sparsity of either of the one or more pruned layers of the encoder stage and/or the decoder stage.

11. The method according to claim 8, wherein a number of pruned layers in the encoder stage is less than the number of pruned layers in the decoder stage.

12. The method according to claim 8, wherein obtaining the Generator by pruning further comprises a step of:
performing a sensitivity analysis on the plurality of layers of the encoder stage and the decoder stage and the bottleneck layer of the encoder stage to obtain the set of sensitivity parameters.

13. A method of determining parameters for a computer-implemented generative neural network for processing an audio signal, wherein the generative neural network comprises an encoder stage and a decoder stage, with the encoder stage mapping to a coded feature space, wherein each of the encoder stage and the decoder stage comprises a plurality of convolutional layers, and wherein each convolutional layer comprises one or more weight coefficients, the method comprising a plurality of cycles, each cycle with sequential processes of:
pruning the weight coefficients of the encoder stage and/or the decoder stage based on pruning control information to obtain a pruned generative neural network, wherein the pruning control information determines the number of weight coefficients that are pruned for respective convolutional layers, wherein the pruning comprises zeroing one or more weight coefficients based on the pruning control information, and wherein the encoder stage comprises a bottleneck layer that maps to the coded audio feature space, and wherein the pruning control information is initially chosen such that the process of pruning the weight coefficients involves pruning the bottleneck layer as well as pruning one or more convolutional layers of the encoder stage and/or the decoder stage adjacent to the bottleneck layer, and such that an increase in sparsity of the bottleneck layer is less than the increase in sparsity of the one or more pruned layers of the encoder stage and/or the decoder stage adjacent to the bottleneck layer;
training the pruned generative neural network for one of more epochs based on a set of training data;
determining a loss for the trained and pruned generative neural network based on a loss function; and
determining updated pruning control information so as to minimize a difference between the determined loss and a target loss for the generative neural network,
wherein the method further comprises training a second instance of the generative neural network based on the set of training data, the second instance of the generative neural network being unpruned; and
determining a loss for the trained second instance of the generative neural network based on the loss function, and using said loss as the target loss for the generative neural network.

14. The method according to claim 13, wherein the pruning control information comprises sensitivity parameters for the plurality of convolutional layers of the encoder stage and the decoder stage.

15. The method according to claim 13, wherein determining the updated pruning control information comprises increasing or decreasing pruning sensitivity for the plurality of convolutional layers of the generative neural network.

16. The method according to claim 15, wherein determining the updated pruning control information comprises applying a scaling factor to the pruning control information to increase or decrease pruning sensitivity for the plurality of convolutional layers of the generative neural network.

17. The method according to claim 13, wherein the sequential processes are cycled through for a plurality of times until a convergence criterion is met, wherein the convergence criterion relates to whether a difference between the determined loss and the target loss is below a predetermined threshold and/or whether a change, from one cycle to the next, of the difference between the determined loss and the target loss is below a predetermined threshold.

18. The method according to claim 13, further comprising:
setting the number of epochs for training in the process of training the pruned generative neural network based on a rate of change of the pruning control information from one cycle to the next.

19. The method according to claim 13, wherein the loss function comprises a component corresponding to an adversarial loss and/or a component corresponding to a time-domain L1-norm loss.

20. The method according to claim 13, wherein the loss function further comprises a component corresponding to a frequency-domain loss, wherein the frequency-domain loss is a multi-resolution Short-Time Fourier Transform, STFT, loss.

21. The method according to claim 13, wherein the pruning control information is initially chosen such that the process of pruning the weight coefficients involves pruning less layers in the encoder stage than in the decoder stage.

* * * * *